United States Patent
Brouillette et al.

(10) Patent No.: US 10,798,103 B2
(45) Date of Patent: Oct. 6, 2020

(54) ADAPTIVE DEVICE ENROLLMENT

(71) Applicant: VMware, Inc., Palo Alto, CA (US)

(72) Inventors: Nicholas Brouillette, Smyrna, GA (US); Harit Patel, Atlanta, GA (US); Ujwal Naik, Atlanta, GA (US); Vinay Jain, Fremont, CA (US); Sridevi Ravuri, Sunnyvale, CA (US); Adarsh Jain, Atlanta, GA (US); Nischit Shetty, Cumming, GA (US)

(73) Assignee: VWware, Inc., Palo Alto, CA (US)

( * ) Notice: Subject to any disclaimer, the term of this patent is extended or adjusted under 35 U.S.C. 154(b) by 151 days.

(21) Appl. No.: 15/818,797

(22) Filed: Nov. 21, 2017

(65) Prior Publication Data
US 2019/0158506 A1    May 23, 2019

(51) Int. Cl.
G06F 15/173   (2006.01)
H04L 29/06    (2006.01)
H04L 12/24    (2006.01)
H04L 29/08    (2006.01)
G06Q 10/06    (2012.01)

(52) U.S. Cl.
CPC ........ H04L 63/105 (2013.01); H04L 41/0893 (2013.01); H04L 63/0815 (2013.01); H04L 63/104 (2013.01); H04L 63/20 (2013.01); H04L 67/10 (2013.01); H04L 67/306 (2013.01); G06Q 10/0639 (2013.01); H04L 63/083 (2013.01)

(58) Field of Classification Search
CPC . H04L 63/105; H04L 63/0815; H04L 63/083; H04L 41/0893; H04L 67/10; H04L 67/67306; G06Q 10/0639
USPC .................. 709/220, 221, 223, 224
See application file for complete search history.

(56) References Cited

U.S. PATENT DOCUMENTS

| | | | |
|---|---|---|---|
| 8,479,263 B1 | 7/2013 | Liu | |
| 8,613,070 B1 | 12/2013 | Borzycki | |
| 8,849,978 B1* | 9/2014 | Batson | H04L 67/10 709/223 |
| 9,143,530 B2* | 9/2015 | Qureshi | H04W 12/06 |
| 9,413,745 B1 | 8/2016 | Rowley | |
| 10,445,106 B2* | 10/2019 | Roszak | H04L 67/34 |
| 10,620,965 B2* | 4/2020 | Roszak | G06F 8/63 |
| 10,628,149 B2* | 4/2020 | Sharma | G06F 8/65 |

(Continued)

OTHER PUBLICATIONS

International Search Report dated Feb. 21, 2019 for International Application No. PCT/US2018/062147.

*Primary Examiner* — Thu Ha T Nguyen
(74) *Attorney, Agent, or Firm* — Clayton, McKay & Bailey, PC

(57) ABSTRACT

Examples described herein include systems and methods for dynamically determining enrollment requirements and enrolling a user device into a management system. The systems and methods can differ based on the type and version of operating system executing on the user device. With some operating systems, enrollment can be completed through a single application that performs other functionality, such providing single-sign-on access to enterprise resources. With other operating systems, enrollment can be completed by pausing the first application and requiring installation of an agent application to complete enrollment. The determination of how and when to enroll a user device can be done automatically and can be based on an organizational group to which the user belongs.

20 Claims, 17 Drawing Sheets

(56) References Cited

U.S. PATENT DOCUMENTS

| | | |
|---|---|---|
| 2002/0174238 A1 | 11/2002 | Sinn |
| 2003/0055652 A1 | 3/2003 | Nichols |
| 2005/0081055 A1 | 4/2005 | Patrick |
| 2006/0031683 A1 | 2/2006 | Marion |
| 2006/0018465 A1 | 8/2006 | Melo |
| 2007/0096894 A1 | 5/2007 | Lemmon |
| 2007/0208744 A1 | 9/2007 | Krishnaprasad |
| 2010/0100925 A1 | 4/2010 | Hinton |
| 2012/0226813 A1 | 9/2012 | Ragusa |
| 2012/0254957 A1 | 10/2012 | Fork |
| 2012/0291090 A1 | 11/2012 | Srinivasan |
| 2014/0040979 A1 | 2/2014 | Barton |
| 2014/0066015 A1 | 3/2014 | Aissi |
| 2014/0195927 A1 | 7/2014 | Deweese |
| 2014/0331060 A1 | 11/2014 | Hayton |
| 2014/0344446 A1* | 11/2014 | Rjeili ................. H04L 43/04 709/224 |
| 2015/0244711 A1* | 8/2015 | Venkataraman .... H04L 63/0823 713/156 |
| 2015/0249617 A1* | 9/2015 | Chang ................. H04L 47/70 709/225 |
| 2016/0087957 A1 | 3/2016 | Shah |
| 2016/0285875 A1 | 9/2016 | Lenz |
| 2016/0328577 A1 | 11/2016 | Howley |
| 2017/0018007 A1 | 1/2017 | Defrank |
| 2017/0064549 A1 | 3/2017 | Rykowski |
| 2017/0094509 A1* | 3/2017 | Mistry ............ H04W 12/0608 |
| 2017/0118211 A1 | 4/2017 | Murthy |
| 2017/0149795 A1* | 5/2017 | Day, II ................. H04W 4/02 |
| 2017/0230848 A1 | 8/2017 | Brouillette |
| 2017/0339564 A1 | 11/2017 | Momchilov |
| 2018/0054434 A1* | 2/2018 | Lingamallu ........ H04L 63/0823 |
| 2018/0109636 A1* | 4/2018 | Hardy ................. H04L 67/18 |
| 2018/0276386 A1* | 9/2018 | Roszak ............... G06F 21/575 |
| 2019/0068373 A1* | 2/2019 | Konduru ............ H04L 63/0815 |
| 2019/0132307 A1* | 5/2019 | Pitchaimani ....... H04L 63/0815 |
| 2019/0132321 A1* | 5/2019 | Pitchaimani ....... H04L 63/0815 |
| 2019/0158476 A1* | 5/2019 | Brouillette ........... G06F 3/0482 |
| 2019/0158498 A1* | 5/2019 | Brouillette ............ H04L 63/10 |
| 2019/0158500 A1* | 5/2019 | Brouillette ........... H04L 63/101 |
| 2019/0158506 A1* | 5/2019 | Brouillette ......... H04L 41/0893 |

\* cited by examiner

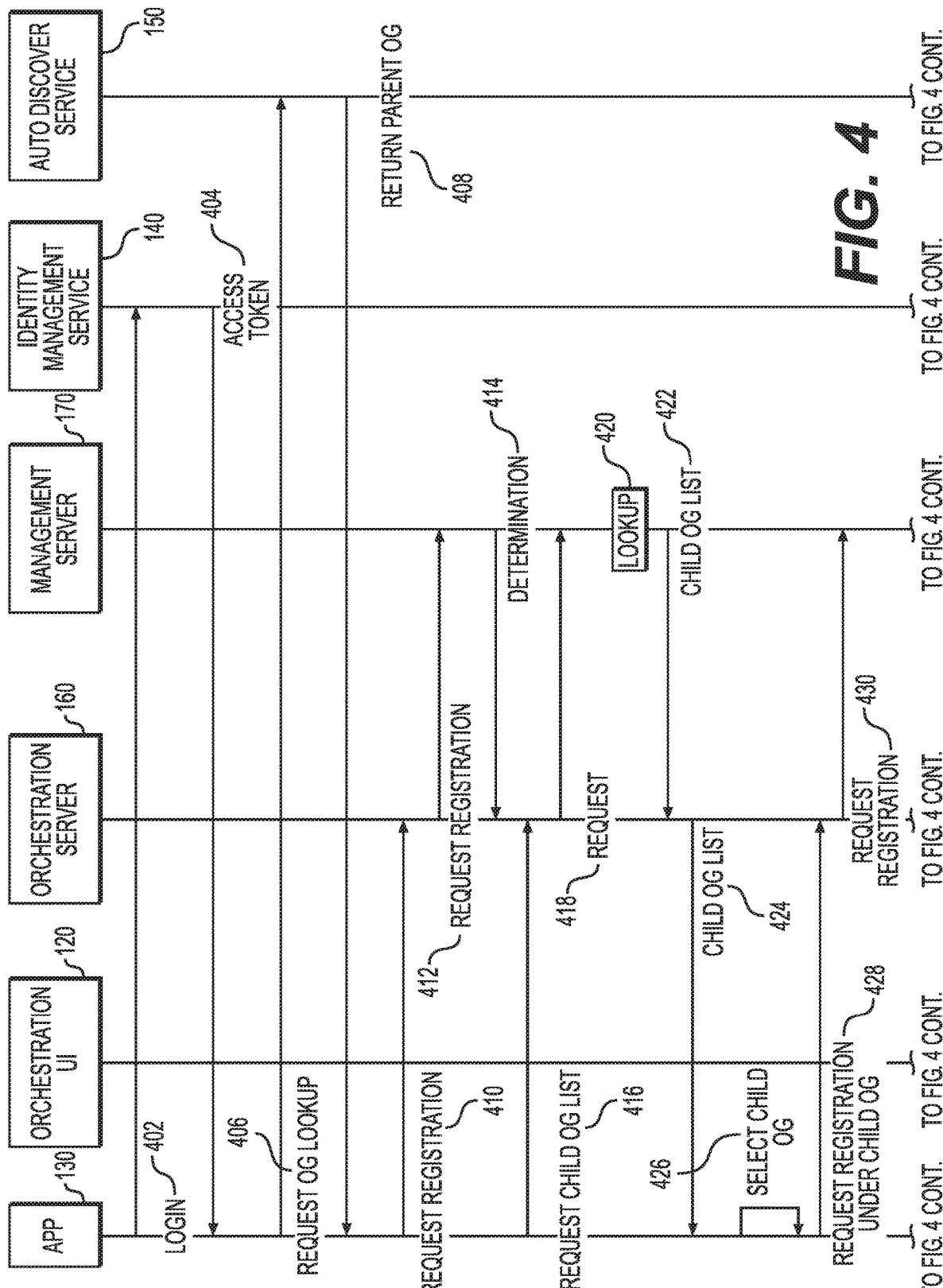

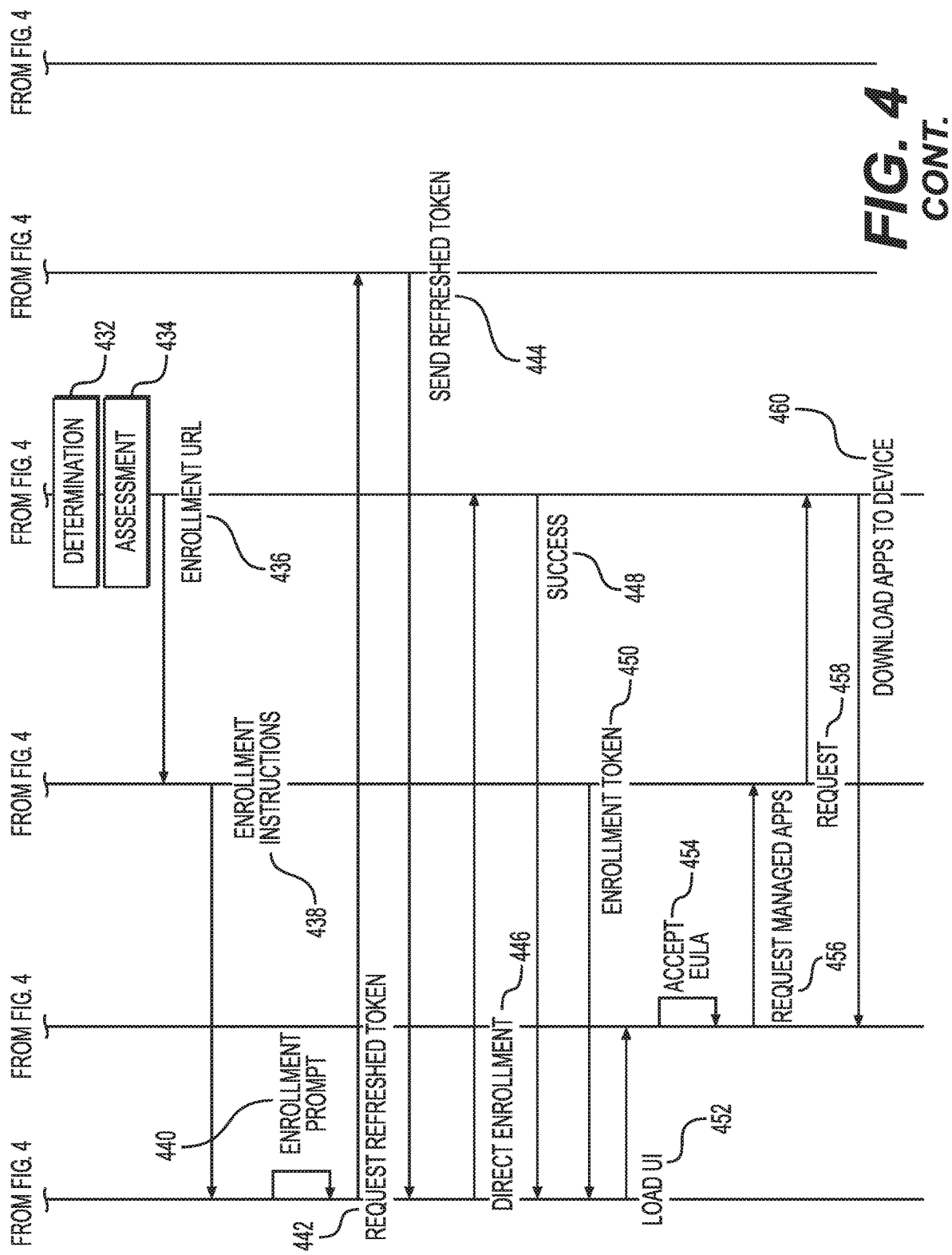

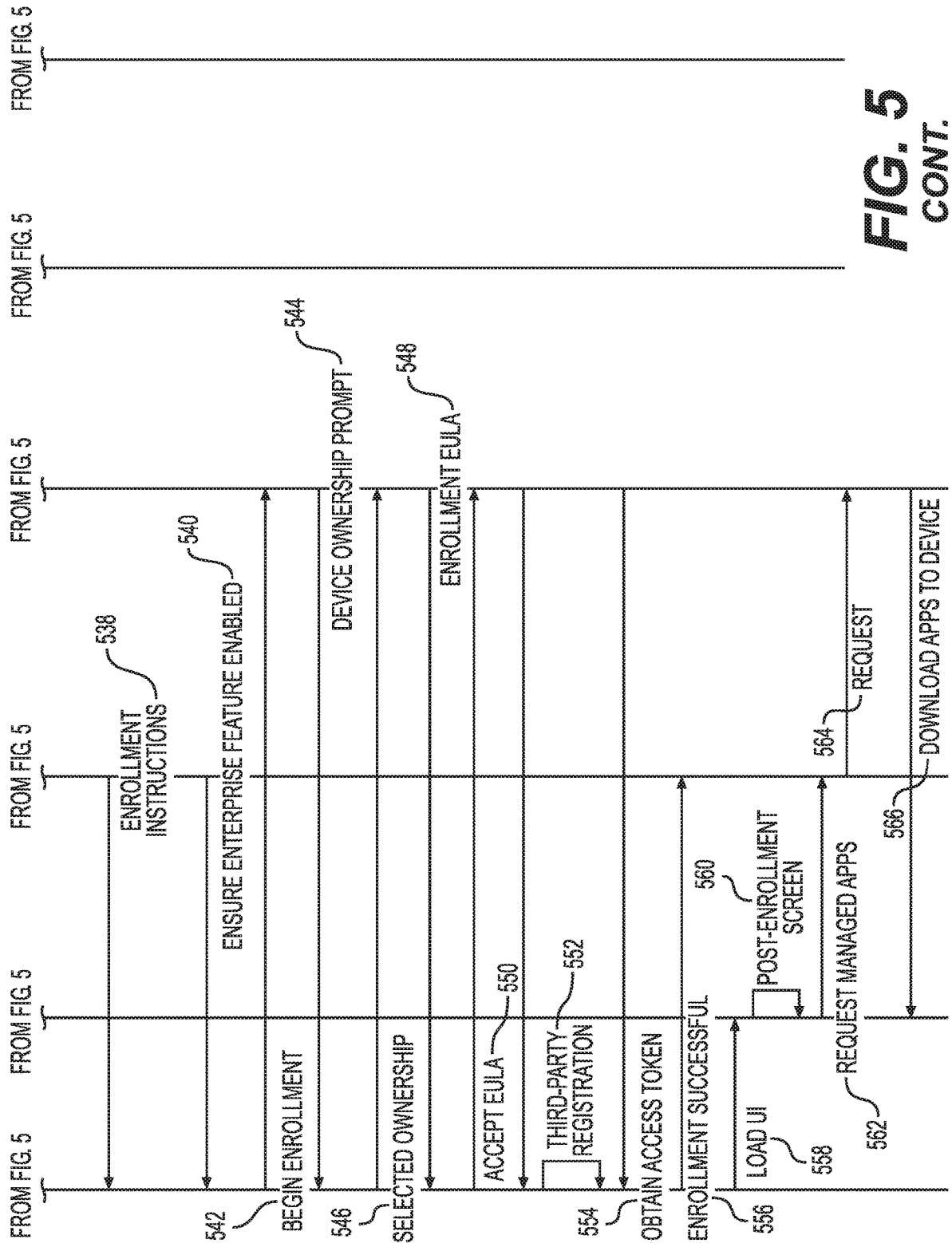

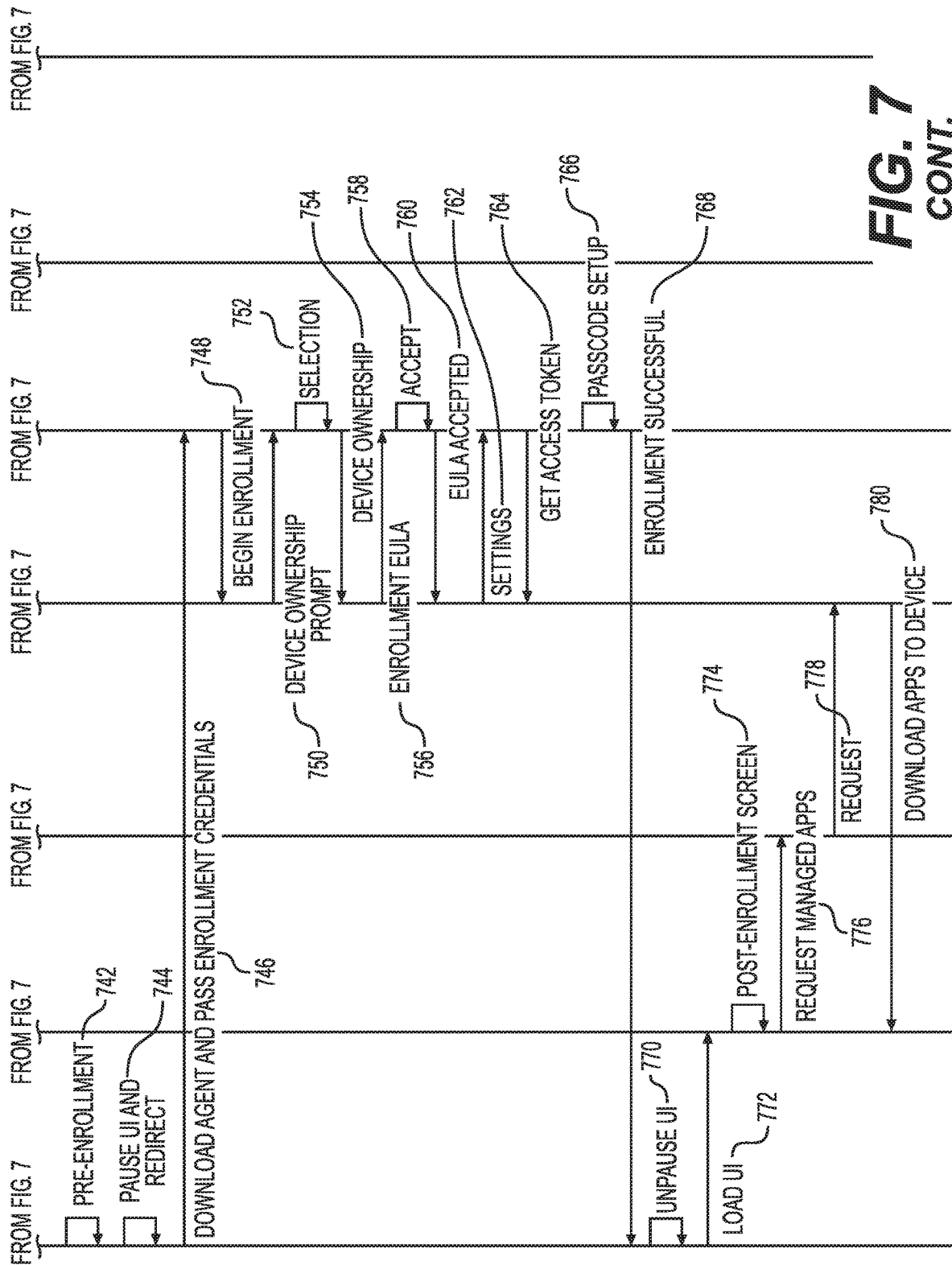

ADAPTIVE DEVICE ENROLLMENT

BACKGROUND

Enterprises increasingly rely on management systems—such as an Enterprise Mobility Management ("EMM") or Mobile Device Management ("MDM") system—to manage the mobile devices of their employees. These systems can competently manage both enterprise-owned and user-owner devices. But in order to manage a device, that device must first be enrolled with the management system. The enrollment process can be inefficient, leading to productivity losses or even discouraging employees from enrolling at all.

One example inefficiency of some management systems is the lack of fine control over when enrollment is required. For example, a device assigned to a Research Engineer probably needs the security provided by immediately enrolling in the management system, while a device assigned to a sales intern may not need that level of security from day one. But current management systems are blind to these differences when it comes to the timing of enrollment, applying blanket requirements to different groups having distinct security needs.

Another inefficiency of some management systems is the requirement of a dedicated application, such as an agent application, that must be downloaded to a device to perform enrollment. Injecting this application into the enrollment process slows the enrollment process, decreases employee productivity, and can discourage some employees from enrolling at all. While these dedicated applications may have been necessary for older operating systems executed by mobile devices, newer operating systems can potentially perform enrollment without such application. But the current management systems lack the ability to recognize these distinctions or take advantage of them.

As a result, a need exists for improved systems and methods of adaptively providing device enrollment into an EMM or MDM system. More specifically, needs exist for these systems and methods to adaptively select enrollment workflows based on information specific to the device and its user, and perform enrollment directly from an application that increases, rather than decreases, employee productivity.

SUMMARY

Examples described herein include systems and methods for dynamically determining enrollment requirements and enrolling a user device into a management system. The systems and methods can differ based on the type and version of operating system executing on the user device. In one example, a method can include receiving user credentials at a user interface (UI) of an application installed on the user device. The credentials can be entered manually by the user, for example. The method can also include receiving, at the application, an access token based on the user credentials. The access token can be received from an identity management service or other service that manages access tokens.

The method can also include receiving, at the application, an identification of an organizational group to which the user belongs. The user can manually select the organizational group, or the organizational group can be looked up by a separate service, such as an auto-discover service. The auto-discover service can identify an organizational group based on the user's email address, for example. The method can include determining whether the identified organizational group enables the user device to directly enroll with the management system.

If the organizational group is not enabled, the method can include requesting a list of child organizational groups available for the identified organizational group and receiving an indication of at least one of the child organizational groups to which the user belongs. The method can then include determining whether the child organizational group enables the user device to directly enroll with the management system. If so, the method can include requesting the assessment by the management server that the user device is allowed to enroll at the management server. If the child organizational group does not enable the user device to directly enroll, then enrollment may require downloading and installing an agent application.

If the identified organizational group enables the user device to directly enroll with the management system, the method can also include requesting an assessment by a management server that the user device is allowed to enroll at the management server. The assessment can be based on restrictions stored at the management server. One assessment allows for a user device to receive direct enrollment. Direct enrollment allows a user device to receive full management capabilities without having to go through an agent-based enrollment process, in which a management agent is first installed on the user device. In one example, when a user logs into an enterprise application, the management server can determine the user device should receive direct enrollment based on, for example, an organizational group associated with the user. Even where the selected organizational group enables direct enrollment, the device may not pass the assessment based on one or more restrictions set at the management server, such as when the device is jailbroken.

In one example, direct enrollment includes presenting a screen to the user to allow the user to select which elements of a full enrollment package to install. This can allow all the selected apps to be pushed to the user device as part of one transaction, in an example, rather than the user having to cancel each installation of apps they do not want. This can decrease the number of prompts presented to the user compared to normal enrollment.

The method can include receiving the assessment that the user device is allowed to enroll at the management server. The method can also include prompting the user to provide a selection indicating whether the user device is corporate owned, and based on the selection, presenting a terms-of-use agreement to the user. The application UI can then display a prompt for the user to proceed with enrollment, and upon selection, the user device can be enrolled with the management server by the application. The application UI can then display a prompt to select one or more managed applications to install on the user device. The method can include downloading the managed applications selected by the user at the application UI.

The method can also include determining whether the operating system of the user device requires an enterprise feature to be enabled in order to perform direct enrollment. If so, the method can include confirming that the enterprise feature has been enabled for the user device.

Another example method can be applied in some situations, such as the user device is not able to directly enroll with the management system through the application, for example, based on the capabilities of the operating system installed on the user device. That example method can include receiving user credentials at a UI of an application installed on the user device, receiving an access token based on the user credentials, and receiving an identification of an organizational group to which the user belongs. Receiving the identification or an organizational group can also include requesting a list of child organizational groups available for the identified organizational group and receiving an indication of at least one of those child organizational groups to which the user belongs. The method can also include determining that the user device is not able to directly enroll with the management system through the application.

If the user device is not able to directly enroll, the method can include pausing the UI of the application and redirecting the user to download an agent application. The user device can download and install the agent application and then pass the user credentials from the application to the agent application. The method can also include prompting the user to provide a selection at a UI of the agent application indicating whether the user device is corporate owned, and based on the selection, presenting a terms-of-use agreement to the user.

The agent can enroll the user device with the management server. The method can then include unpausing the UI of the application and displaying, on the UI, a prompt for the user to select one or more managed applications to install on the user device. The selected managed applications can then be downloaded.

Determining that the device is not able to directly enroll can include determining that the operating system of the user device requires an enterprise feature to be enabled in order to perform direct enrollment, and that the enterprise features has not been enabled for the user device. In another example, determining that the user device is not able to directly enroll with the management system through the application can include determining that the identified organizational group does not enable the user device to directly enroll.

In another example, a method is provided for enrolling a user device with a management system using a portal application. The portal application can be an application that provides varying levels of access to multiple other applications that may or may not be installed on the user device. The portal application can display application icons for any icons the user can access, or could potentially access. The portal application can store a user's credentials and provide access to any of the applications represented by the icons on the display by authenticating the user to the applications. For example, the portal application can utilize SSO services to provide access to the applications.

Some applications can require enrollment with a management system in order to access. The portal application can assist in the enrollment process by communicating with a management server—such as by exchanging tokens—obviating the need to download a management-dedicated application, such as an agent application. After enrolling the user device with the management system through the portal application, the portal application can be provided with access to enterprise data. For example, the portal application can provide access to an enterprise application.

Enrolling the user device with the management server can establish management control over the user device. For example, the management server can send policies to the portal application. Those policies can provide restrictions or other requirements for the user device, including remedial actions for when those restrictions or requirements are not met. Similarly, the portal application can receive and enforce compliance rules sent by the management server. If a compliance rule is broken, the portal application can take remedial action as instructed by the management server.

In another example, a method is provided for determining organizational-group-based enrollment requirements for enrolling a user into a management system. The example method can include receiving, at a portal application installed on the user device, an identification of an organizational group to which the user belongs. The identification can be obtained by the portal application requesting a lookup of the organizational group at an auto-discover service, for example. It can also be obtained by prompting the user for manual input regarding their organizational group.

The method can also include receiving a determination as to whether the identified organizational group enables the portal application to enroll with the management system. If enrollment by the portal application is enabled for that organizational group, then the portal application can request enrollment. If enrollment is not enabled for that organizational group, then the portal application can request a list of child organizational groups available for the identified organizational group.

The portal application can then receive an indication of at least one of the child organizational groups. For example, the user can manually select one of the child organizational groups. In another example, a lookup is performed based on information associated with the user and the results are returned to the portal application. Having narrowed down a particular child organizational group, the portal application can then receive a determination as to whether that child organizational group allows for direct enrollment by the portal application. If so, the portal application can request enrollment at the management server.

As part of the enrollment process, the portal application can prompt the user to provide a selection indicating whether the user device is corporate owned. Based on that selection, the portal application can present a terms-of-use agreement to the user.

The example methods summarized above can be incorporated into a non-transitory, computer-readable medium having instructions that, when executed by a processor associated with a computing device, cause the processor to perform stages for dynamically determining enrollment requirements and enrolling a user device into a management system. Additionally, the example methods summarized above can be implemented in a system including, for example, a user device, management server, identity management service, auto-discover service, orchestration server, or any combination thereof.

Both the foregoing general description and the following detailed description are exemplary and explanatory only and are not restrictive of the examples, as claimed.

BRIEF DESCRIPTION OF THE DRAWINGS

FIG. 4 is a flowchart of an exemplary method for adaptively enrolling a user device with a management system.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In a first set of examples, systems and methods are provided for dynamically determining enrollment requirements and enrolling a user device into a management system using a single application on the user device. These examples can be useful in situations where a user device includes an operating system that is configured to perform direct enrollment. They can also be useful in situations where the user is associated with an organizational group that allows for direct enrollment.

In a second set of examples, systems and methods are provided for dynamically determining enrollment requirements and enrolling a user device into a management system by pausing the UI of a first application and directing the user to install and use an agent application to continue enrollment. These examples can be useful where a user device includes an operating system that is not configured to perform direct enrollment, or in situations where the user is associated with an organizational group that does not allow for direct enrollment.

Additional examples are also provided, describing variations of the systems and methods provided in the first and second sets of examples. An administrator console is also described. The administrator console can allow an administrator to configure the functionality described herein on a device-specific, organizational-group-specific, or operating-system-specific basis.

Figure 1:
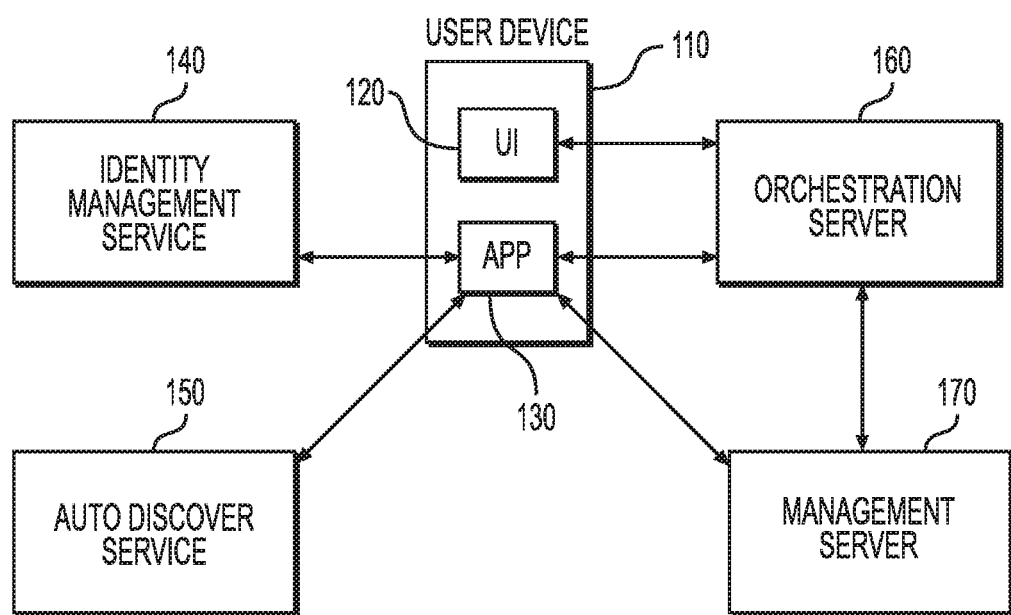
FIG. 1 is an exemplary illustration of system components for adaptively enrolling a user device with a management system.

FIG. 1 provides an illustration of an example system for dynamically determining enrollment requirements and enrolling a user device into a management system. The system can include a user device 110. The user device 110 can be any computing device, such as a smartphone, laptop, tablet, personal computer, or workstation. A user device 110 can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others.

The user device 110 can include an orchestration user interface (UI) 120 (associated with an orchestration server 160) and an application 130. The application 130 can be any application available based on the operating system (OS) executing on the user device 110. The application 130, also referred to interchangeably as a "portal application," can provide a user with a virtual portal to a variety of other applications. In some examples, the other applications need not be installed on the user device 110, because the application 130 can launch browser-based applications in a browser application.

The application 130 can provide a "portal" by, for example, displaying multiple icons associated with different applications. For example, one icon can be associated with BOXER, another icon can be associated with MICROSOFT EXCEL, and yet another icon can be associated with SALESFORCE. By selecting one of these icons through the graphical user interface ("GUI") presented by the application 130, a user can access the applications associated with those icons. An example application 130 is VMWARE's WORKSPACE ONE.

The application 130 can provide access to the displayed applications by authenticating the user and/or user device 110 with the selected application on behalf of the user. For example, the application 130 can store a user's credentials and other pertinent information. When the user selects an application displayed in the portal, the application 130 can authenticate the user by using an SSO service. As a result, the user only needs to login to the portal application 130 in order to access a variety of other applications without additional logins required.

In some examples, the application 130 provides access to enterprise data, such as secure applications (such as an enterprise email account through BOXER), virtual applications, and virtual computer desktops. Enterprise data can be any data associated with an enterprise that is confidential. In some examples, enterprise data is any data that can only be accessed if the user device 110 is enrolled in the EMM or MDM system associated with that enterprise. If a user logs into the application 130 before the device 110 is enrolled, then the application 130 can perform enrollment. Previously, a stand-alone, device-management-based application—typically referred to as an "agent application" and described in more detail later—was required in order to perform enrollment. The present disclosure describes novel ways of performing enrollment directly from a portal application 130. This allows the user to login to a single application 130 and gain access to secure enterprise data as well as a host of other applications, all of which are easily accessible through a single portal.

The system of FIG. 1 can also include an identity management service 140, such as VMWARE IDENTITY MANAGER (vIDM). The identity management service 140 can be a server, computing device, or network of multiple servers or computing devices, having one or more processors and memory stores. The identity management service 140 can control access to enterprise applications or other enterprise data by, for example, issuing an access token to a user device 110 that allows the user device 110 to access one or more enterprise resources. The application 130 can communicate directly with the identity management service 140 via a network, such as the internet.

The system can also include an auto-discover service 150. The auto-discover service 150 can be a server, computing device, or network of multiple servers or computing devices, having one or more processors and memory stores. The auto-discover server 150 can route requests to an appropriate environment based on information contained in the request. For example, the auto-discover server 150 can receive a request that includes an email address and then route the request—or provide other information—based on that email address. As an example, a request including an email address of jsmith@vmware.com can cause the auto-discover server 150 to identify a VMWARE environment based on the "@vmware.com" portion of the email address. The auto-discover server 150 can then look up information regarding that environment and provide the information to the user device 110 through the application 130.

The system includes a management server 170 that performs management functions as part of an overall EMM or MDM system. It can be a server, computing device, or network of multiple servers or computing devices, having one or more processors and memory stores. The management server 170 can include various components for enrollment and compliance monitoring and enforcement. An administrator can establish or change enrollment criteria at the management server 170, such that a user device can only enroll at the management server 170 if those criteria are met. An administrator can also set compliance rules at the management server 170 that an enrolled user device must follow. The administrator can also set remedial actions for breaching a compliance rule. These functions are discussed in more detail later in this disclosure.

The system of FIG. 1 also includes an orchestration server 160 that can communicate with the management server 170 and the application 130 on the user device 110. The orchestration server 160 can be a server, computing device, or network of multiple servers or computing devices, having one or more processors and memory stores, and can communicate with both the management server 170 and user device 110. For example, the orchestration server 160 can receive a request from the application 130 and pass it to the management server 170, receive a response from the management server 170, and present a UI 120 for the user to make certain selections requested by the management server 170. The UI 120 can receive the selections and pass them to the orchestration server 160, which then passes the selections to the management server 170. The orchestration server 160 can therefore handle an administrative burden for the management server 170, freeing resources for the management server 170 to perform other enterprise-management functions.

One or more of the orchestration server 160, management server 170, and identity management service 170 can be combined into one or more servers, in an example.

The functionality of the system of FIG. 1 is described in more detail with respect to FIGS. 2-5. Certain figures, such as FIGS. 2, 4, 5, and 7 are too large to fit on a single page and are therefore presented across additional pages, denoted by "CONT."

Figure 2:
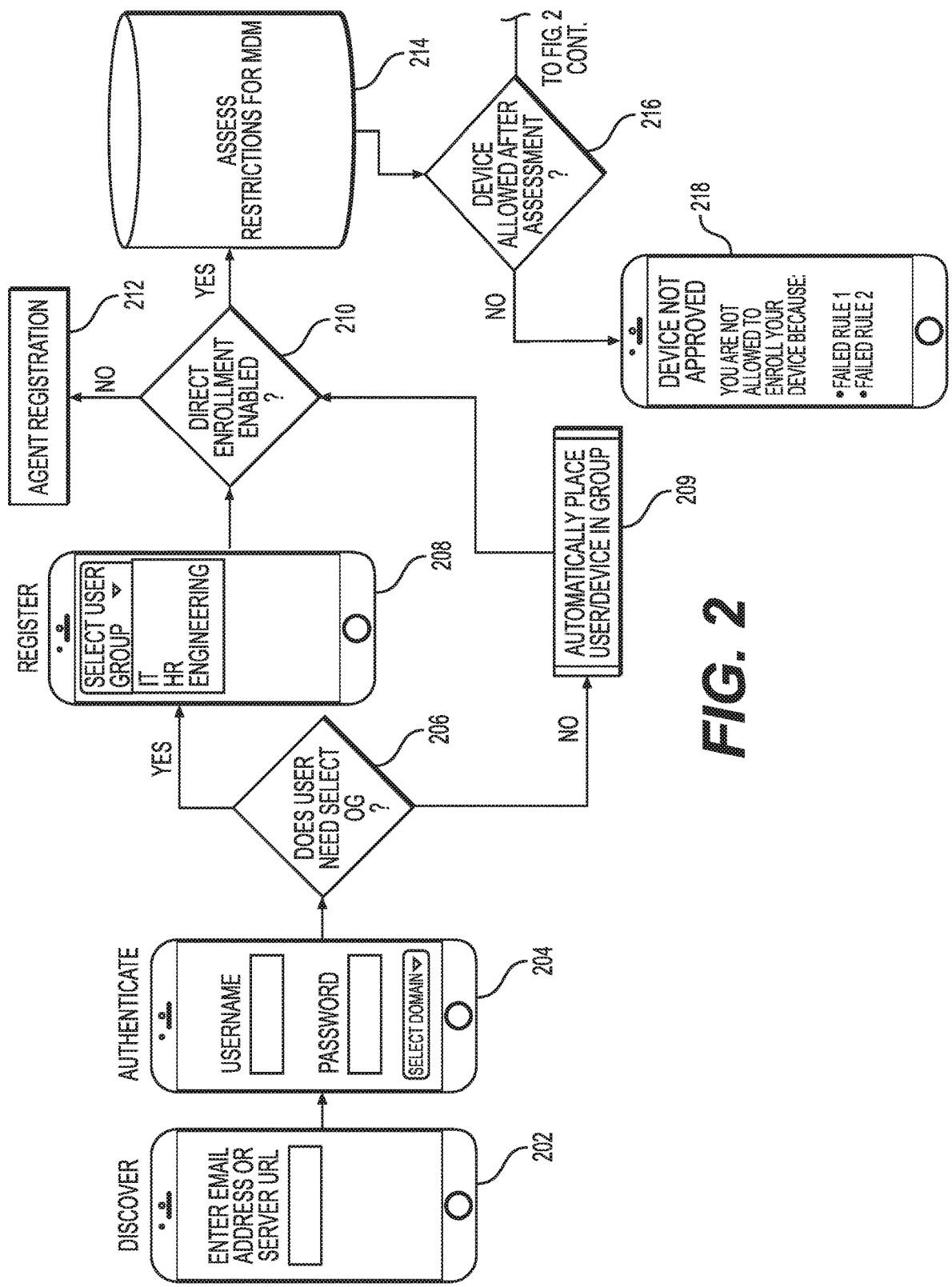
FIG. 2 is a flowchart of an exemplary method for adaptively enrolling a user device with a management system.
Figure 2:
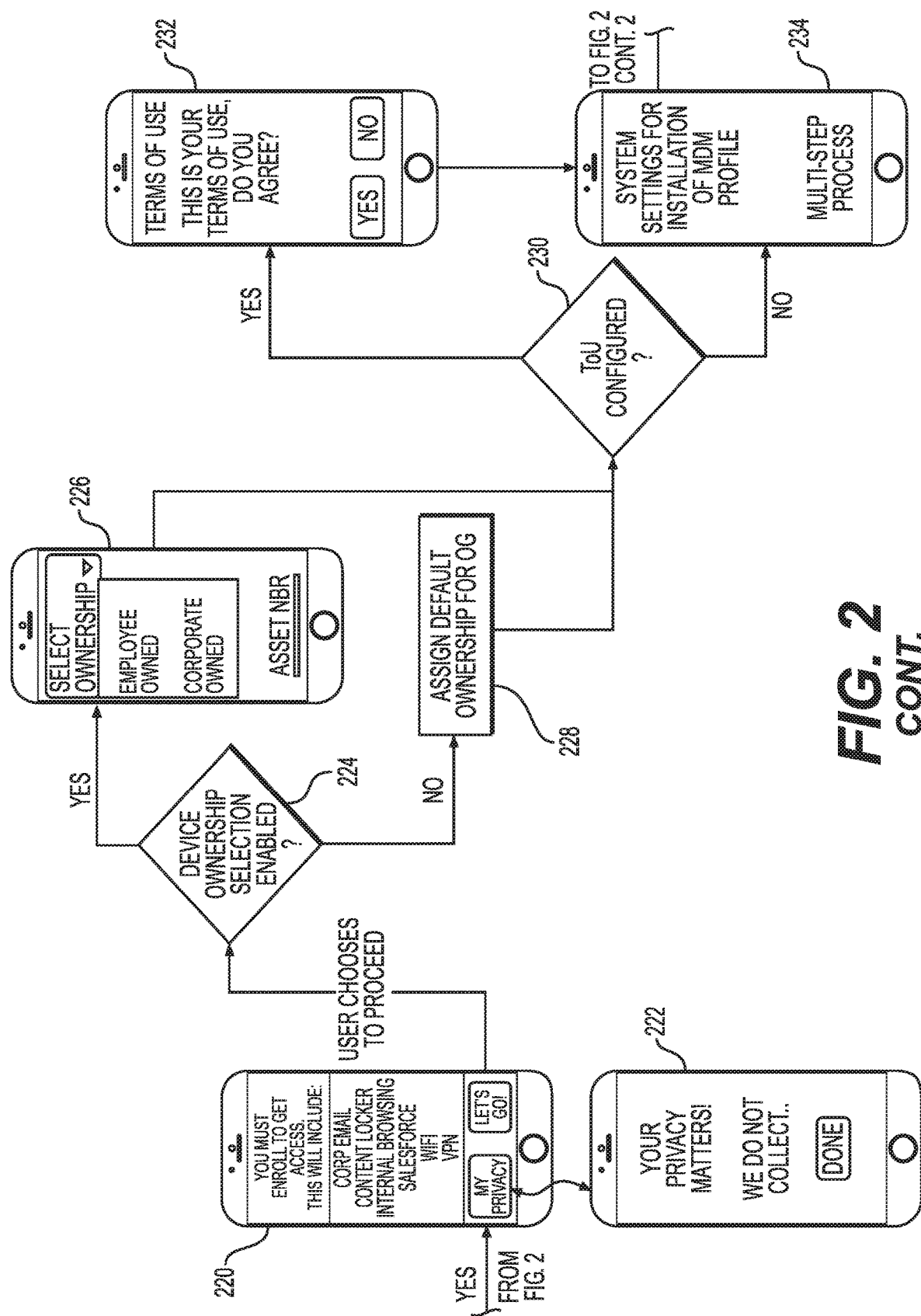
Figure 2:
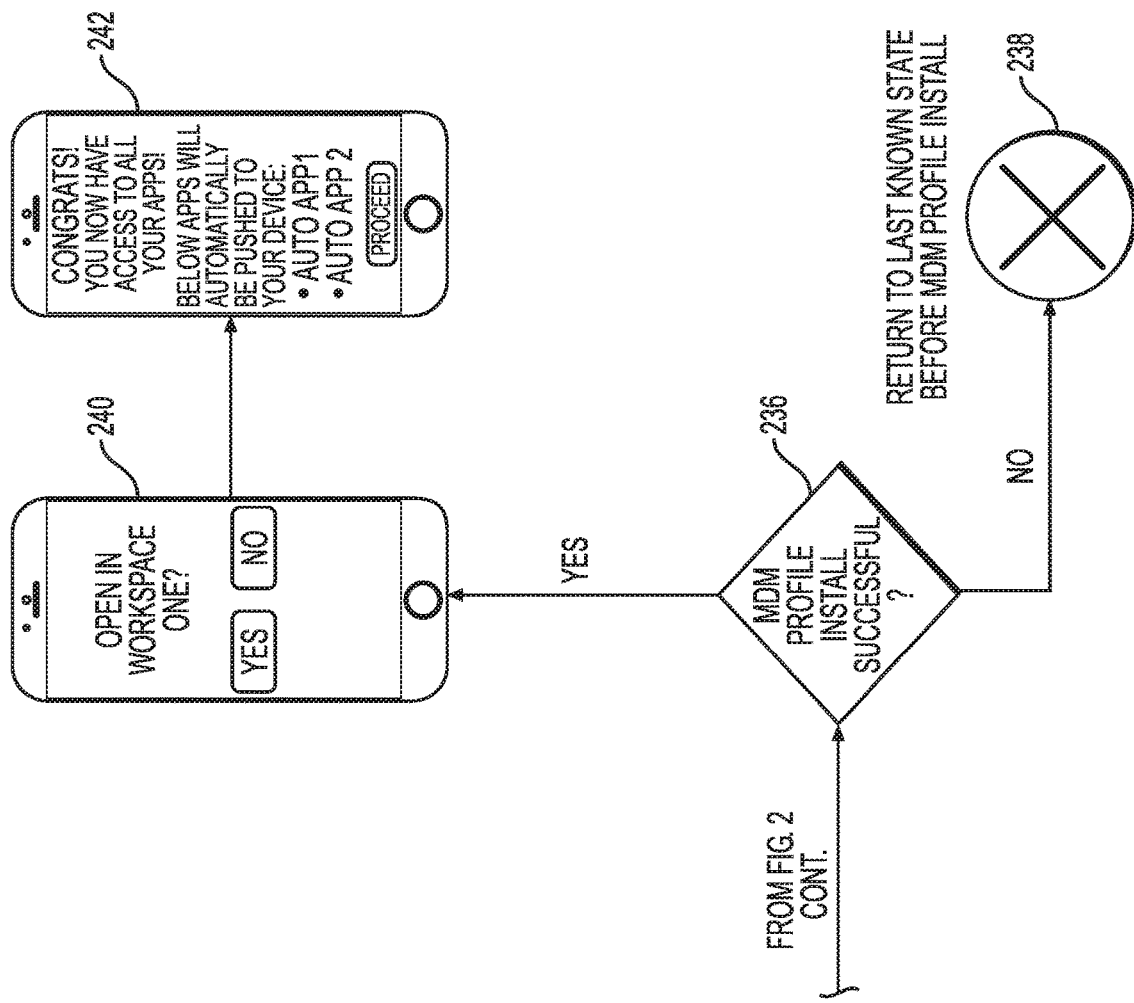

FIG. 2 presents a flowchart of an exemplary method for adaptively enrolling a user device 110 with a management system. At stage 202, the user is presented with a prompt, through the application 130, to enter an email address or server Uniform Resource Locator ("URL"). The email address or server URL can be sent to an auto-discover service 150 that can route further information or requests to an environment corresponding to the identified email address or server. At stage 204, the application 130 presents the user with a prompt to enter credentials, such as a username and password. Those credentials can be sent to an identity management service 140 that authenticates the user and returns an access token to the user device 110. Stages 202 and 204 can be performed in any order.

Additionally, the information gathered at stages 202 or 204 can be used to request an organizational-group lookup. In one example, the auto-discover service 150 can identify an environment based on the email address or server URL and look up a list or organizational groups corresponding to that email address or server URL. In another example, the auto-discover service 150, management server 170, or another server can identify a specific organizational group corresponding to the user identified and authenticated at stage 204.

At stage 206, a determination is made as to whether the user needs to select an organizational group. This determination can be made by the auto-discover service 150 or management server 170, for example. The user may need to select an organizational group when the environment identified by the email address or server URL identifies multiple potential organizational groups. On the other hand, the user may not need to select an organizational group when only one exists for the identified environment, or when the auto-discover service 150 or management server 170 identifies a particular organizational group for the user in advance, based on the credentials obtained on stage 204.

If the user does not need to select an organizational group, then at stage 209 the user is automatically placed in the organizational group. If the user needs to select an organizational group, then at stage 208 the application 130 can present the user with a prompt to select a group. For example, the prompt can include a drop-down menu that is populated with available organizational groups identified by the auto-discover service 150. After selecting an organizational group at stage 208 or determining that no selection is necessary at stage 209, stage 210 includes determining whether direct enrollment is enabled. Direct enrollment, in this context, can mean enrolling the user device 110 through the application 130, rather than requiring a separate application to perform the enrollment.

The determination of whether direct enrollment is enabled is discussed in more detail later, but can include, for example, determining the type and version of operating system executing on the user device 110, and determining whether an enterprise feature allowing direct enrollment is enabled. If direct enrollment is not enabled, then at stage 212 enrollment can be performed through an agent application, described later. If direct enrollment is enabled, then at stage 214 the management server 170 can perform an assessment as to whether the user device 110 is allowed to enroll. The assessment can include assessing restrictions, such as whether the user device 110 is restricted based on its platform, model, manufacturer, or operating system, or whether the user is restricted based on the organizational group, geographic location, or other factors.

At stage 216, the result of the assessment is received. If the device is not approved to enroll, then at stage 218 the application 130 can display a notice to the user that the device is not approved for enrollment. The notice can include reasons why the device is not approved, such as failed rules or restrictions as determined by the management server 170. If the device is approved to enroll, then at stage 220 (shown in FIG. 2 CONT.) the application 130 can display a notice regarding enrollment. The notice can inform the user of the benefits of enrollment and provide a privacy policy, either in the display or through a button or link. The button or link, if selected by the user, can display the privacy policy at stage 222.

When the user chooses to proceed with enrollment, stage 224 can include an assessment of whether the device 110 is ownership-selection enabled. In other words, the assessment can determine whether the use is able to select between ownership types, or whether the ownership type is already established. In some examples, the user may not be allowed to make such a selection. For example, a corporate-owned device 110 may be set up such that the selection is not allowed. In another example, the auto-discover service 150 or management server 170 can include a rule that the corporate-owned device 110 does not allow such a selection. If no selection is allowed, the default or indicated ownership is applied at stage 228. If selection is allowed, then at stage 226 the application 130 provides a prompt for the user to select between "employee owned" or "corporate owned."

Based on the selection made at stage 226 or applied at stage 228, a Terms of Use can be tailored to the user device 110. If the system determines that no Terms of Use is needed at stage 230, then the method can proceed to stage 234. If the system determines that a Terms of Use is needed at stage 230, then at stage 232 the Terms of Use can be presented to the user, along with a mechanism for the user to accept the terms. After acceptance, the method can proceed to stage 234.

At stage 234, the device 110 is enrolled with the management server 170. This process is discussed in more detail later in this disclosure. As a result of enrollment, an MDM or management profile can be installed on the user device 110. At stage 236 (shown in FIG. 2 CONT. 2), the system can check to determine whether the MDM or management profile was installed successfully. If not, then at stage 238 the device 110 can be returned to the last known state before the attempted install. If the install was successful, then the user can be prompted to open the application 130 at stage 240. Through the application, the user can select various managed applications to download and install at stage 242.

Figure 3:
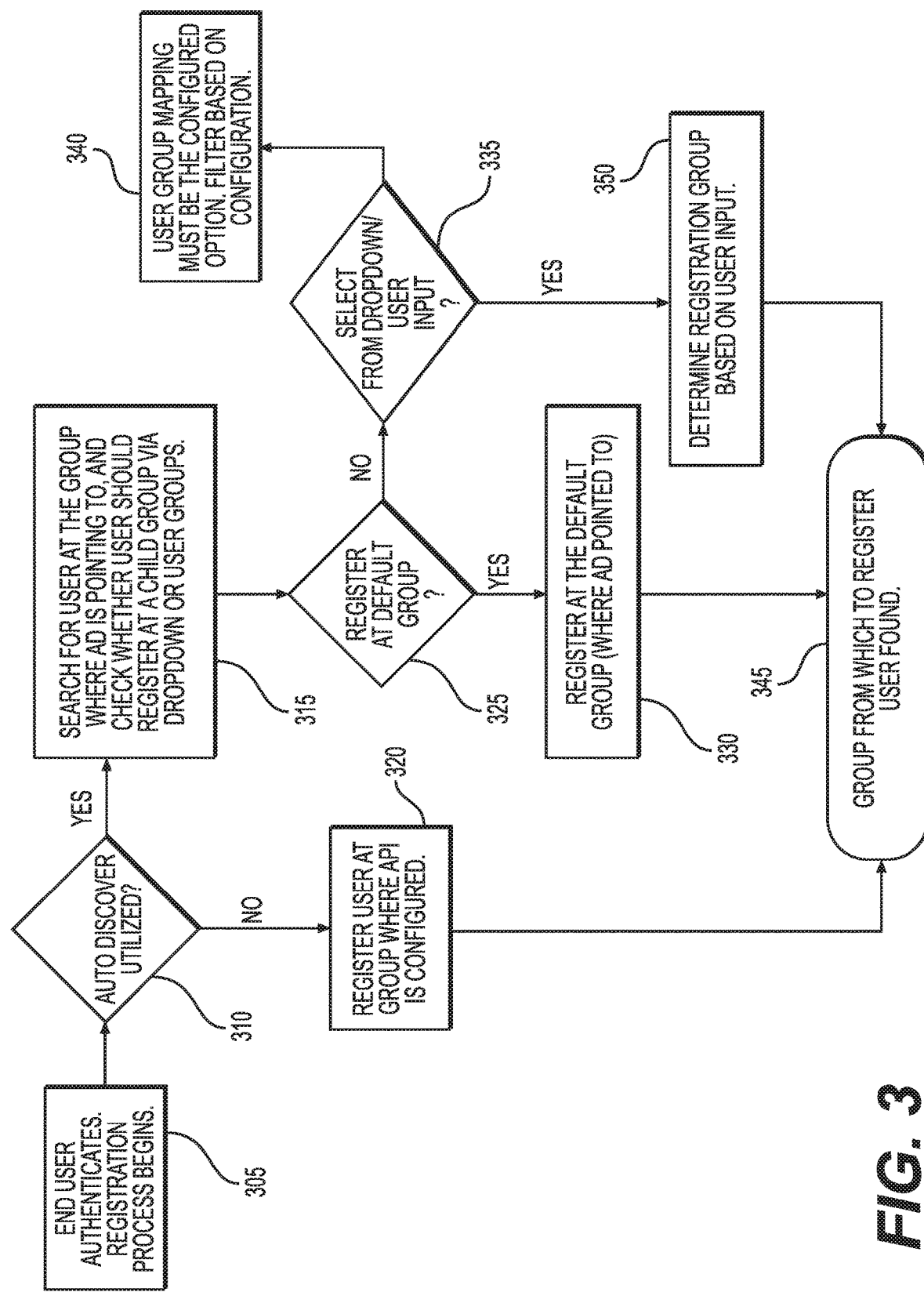
FIG. 3 is a flowchart of an exemplary method for identifying an organizational group with which to adaptively enroll a user device with a management system.

FIG. 3 provides a flowchart of an exemplary method for identifying an organizational group associated with a user attempting to enroll a device 110. In some examples, this flowchart can be considered an extension or alternate version of stages 202-209 of FIG. 2. At stage 305 of the method, an end user authenticates and begins the registration process. This can involve providing user credentials and an email address or server URL, for example.

At stage 310, a determination is made as to whether the auto-discover service 150 is available for assisting in determining the user's organizational group. If it is not, the method can proceed to stage 320, where the user is registered in association with the organizational group to which the application programming interface ("API") is configured. For example, the API can use a standard organizational group for all users, or a standard organizational group for all users within a particular enterprise environment. In that case, the group can be assigned and at stage 345, the method can include registering the user using that organizational group.

If, on the other hand, the auto-discover service 150 is available for assisting in determining the user's organizational group, then at stage 315 a search can be conducted. The search can be a request to the auto-discover service 150, for example. In another example, the search can be a request sent to the management server 170 or another server or database. In either case, the request can seek information regarding whether the user should register at a default group, select an organizational group, or select a child organizational group. A child organizational group can be considered a sub-group of an organizational group. For example, an organizational group entitled "staff" can include multiple child organizational groups, such as "administrator," "secretary," and "accounting."

A determination is made at stage 325, based on information received in response to the search at stage 315, regarding whether to register the user at the default organizational group identified by the auto-discover service 150. If so, then the method can proceed to stages 330 and 345, where the user is registered at the default organizational group identified by the auto-discover service 150. If not, then the method can proceed to stage 335, where the user is prompted to provide input regarding the appropriate child organizational group. For example, the user can select from a list of child organizational groups using any suitable method, such as a drop-down menu.

At stage 340, the system can determine that only a subset of child organizational groups is available for enrolling the device. In that case, the user can be returned to stage 335 or an error message can be generated. In another example, a filter is applied such that the user is assigned to a child organizational group based on the selection at stage 335.

At stages 350 and 345, the child organizational group selected at stage 335 is determined to be the registration group for the user's enrollment. Enrollment can then proceed from there.

FIG. 4 provides a flowchart of an exemplary method for adaptively enrolling a user device with a management system. This example method can be utilized for devices running certain operating systems, such as APPLE's iOS operation system. At stage 402 of the method, a user can login using the application 130 installed on the user device 110. The login credentials can be sent to the identity management service 140, which after authenticating the user, can send an access token back to the user device 110 at stage 404. The access token can be a key-hashed message authentication code ("HMAC"), for example.

At stage 406, the application 130 can request an organizational group lookup from the auto-discover service 150. The auto-discover service 150 can perform the lookup based on an email address, server URL, user credentials, or some combination thereof. For example, the auto-discover service 150 can identify that the email address contains "@vmware.com" and look up an entry for the enterprise environment associated with that email address. The entry may specify one or more organizational groups associated with that enterprise environment. At stage 408, the auto-discover service 150 can return one or more organizational groups back to the user device 110.

At stage 410, the application 130 can request registration. This can occur by, for example, a user logging into the application 130 for the first time. In another example, stage 410 is triggered by an attempt to use an enterprise application or access an enterprise resource. The request can be routed to the orchestration server 160, which forwards the request to the management server 170. Alternatively, the request at stage 410 can be sent directly to the management server 170.

At stage 414, the management server 170 can determine whether the organizational group to which the user belongs, identified at stage 408, allows for direct enrollment to proceed. For example, an organization can enforce finer control over the enrollment process by requiring a specific child organizational group to be selected, rather than allowing enrollment under a more general organizational group. The determination at stage 414 can be made at the user device 110 or orchestration server 160 in some examples. In the example of FIG. 4, the management server 170 makes the determination and provides it to the orchestration server 160, which can then communicate the determination to the user device 110. Alternatively, the management server 170 can provide the determination directly to the user device 110.

If, as a result of the determination at stage 414, it is determined that the user must register with a child organizational group in order to proceed with enrollment, then at stage 416 the user device 110 can request a list of child organizational groups from which to choose. The request can be sent to the orchestration server 160 which can then forward the request along to the management server 170 at stage 418. Alternatively, the request can be sent directly to the management server 170.

The management server 170 can perform a look-up at stage 420 to pull a list of child organizational groups. The look-up can be performed based on information regarding the user device 110, user, relevant enterprise environment, selected organizational group, rules set by an administrator, or any combination thereof. The list of child organizational groups can be sent to the orchestration server 160 at stage 422 and, from there, to the user device 110 and stage 424.

The user can select a child organizational group through the application 130 at stage 426. The selection can include, for example, selecting from a drop-down list of available child organizational groups. The available groups can also be presented in a different format, such as multiple buttons, where the user simply selects the button corresponding to the desired child organizational group. When the selection has been made, the application 130 requests registration under the selected child organizational group at stage 428. The request can be routed through the orchestration server 160 which forwards the request to the management server 170 at stage 430.

Continuing to FIG. 4 CONT., at stage 432 the management server 170 performs a determination as to whether enrollment is enabled for the device 110 and the user. The determination can include various stages. For example, it can include confirming that the selected child organizational group is enabled for direct enrollment through the application 130. The determination can also include verifying that the operating system executing on the device 110 allows for direct enrollment through the application 130. This can include identifying the version of the operating system and comparing it to a whitelist of allowed operating systems and versions.

If stage 432 results in a determination that the operating system allows for direct enrollment through the application 130, then at stage 434 the management server 170 can perform an assessment to determine whether the device 110 meets any enterprise restrictions, compliance rules, or management policies set by an administrator.

A compliance rule can set forth one or more conditions that must be satisfied in order for a user device 110 to be deemed compliant. They can be applied before enrollment, at stage 434, or any time after that. If compliance is broken after enrollment, the management server 170 can take steps to control access of the user device to enterprise files, applications, and email. Compliance rules can be assigned differently to the different organizational groups or child organizational groups. In addition, compliance rules can be assigned differently to different devices 110 assigned to the same user. Compliance rules can control access to enterprise files to the user device 110 based on the user's organizational group or other criteria. Meanwhile, compliance rules can cause the user device 110 to be wiped if it leaves a geographic area, is jailbroken, or if certain software is removed or disabled.

A management policy can specify that a user device 110 has permission to perform or access certain functionality. For example, the user device 110 can be restricted to certain enterprise repositories and functions within applications. A management policy can also specify that a user device 110 has permission according to its organizational group.

Other restrictions can also be applicable at stage 434. For example, enrollment can be restricted based on the device type, device manufacturer, operating system, or any other restriction established by an administrator. The restrictions, compliance rules, and management policies can be stored at the management server 170 and accessed to perform the assessment at stage 434.

If the assessment determines that the user device 110 is allowed to enroll, then at stage 436 the management server 170 can send an enrollment URL to the orchestration server 160. The orchestration server 160 can provide the enrollment URL and any other relevant enrollment instructions to the application 130 at stage 438.

At stage 440, the application 130 can display an enrollment prompt to the user, similar to that shown by element 220 of FIG. 2 CONT. The prompt can inform the user that he or she must enroll to get access to various enterprise resources, such as corporate email, secure content storage, and Virtual Private Networks (VPNs).

At stage 442, the application 130 can request a refreshed access token from the identity management service 140. The identity management service 140 can send a refreshed token at stage 444. The refreshed access token can be used for the enrollment process. Refreshing the access token can ensure that the token is not expired by the time the enrollment process begins.

At stage 446, the application 130 can initiate enrollment with the management server 170. Enrollment can include interacting with an enrollment component or administrator component at the management server 170, or both. The enrollment component can authenticate the access token and can provide to the device 110 any additional credentials required for enrollment. The enrollment component can also provide information regarding how to access and communicate with the administrator component in order to continue the enrollment process.

In some examples, the administrator component can request a token, such as the refreshed access token, from the user device 110, indicating that the user device 110 has been authenticated and is permitted to continue the enrollment process with the administrator component. Upon receiving the token, the administrator component can continue the enrollment process. The administrator component can also provide a console for an administrator to configure and monitor the status of the user device 110 and the enrollment process. In some examples, the administrator component can be dedicated to a particular enterprise or group of enterprises, while the enrollment component can be shared across multiple different enterprises.

Upon successful enrollment, the management server 170 can send a notice to the application 130 at stage 448, informing the application 130 that enrollment was successful. At stage 450, the management server 170—or as shown in FIG. 4, the orchestration server 160—can send an enrollment token to the user device 110. The enrollment token can grant access to the application 130, or to the user device 110 generally, to communicate with the management server 170 and access certain enterprise data and information.

In some examples, the enrollment token is an HMAC token. The application 130 can send a request to the orchestration server 160 requesting enrollment information, such as an HMAC token and MDM device ID. Though not shown in FIG. 4, the orchestration server 160 can send a request to the management server 170 on behalf of the application 130. The management server 170 can check the status of the user device 110 and—if the device 110 is successfully enrolled—retrieve or create an HMAC token. The HMAC token and MDM device ID can then be sent to the orchestration server 160, which then provides both to the application 130. If, on the other hand, the device 110 is not successfully enrolled, the management server 170 can return an error back to the orchestration server 160. In some examples, the orchestration server 160, rather than the management server 170, can perform the enrollment check and retrieve the HMAC token and MDM device ID.

At stage 452, the application 130 can load an orchestration UI 120 associated with the orchestration server 160. The orchestration UI 120 allows the management system to present a UI to the user based on information stored at the management system, such as at the orchestration server 160 or management server 170. In one example, the orchestration UI 120 is the UI of the application 130. In another example, the orchestration UI 120 is a UI displayed within the UI of the application 130 but generated by the orchestration server 160. In yet another example, the orchestration UI 120 is a UI displayed in lieu of, or in addition to, the application's 130 UI, such as within a box displayed on top of the application 130 UI. Using the orchestration UI 120, the device 110 can present the user with an End User License Agreement ("EULA") to which the user can agree at stage 454. The EULA can be a blanket agreement that applies to the use of the management system, or it can be specific to applications that the user wants to install on the user device 110. In the latter case, stage 454 can follow stage 456.

At stage 456, the user selects one or more managed applications that he or she wishes to download and install on the user device 110. For example, the orchestration UI 120 can present a list of managed applications, such that the user can select only those applications that are desired. The request can be delivered to the orchestration server 160 at stage 456, and to the management server 170 at stage 458. The request can also be delivered directly to the management server 170. The management server 170, in turn, can provision the selected applications to the user device at stage 460.

Figure 5:
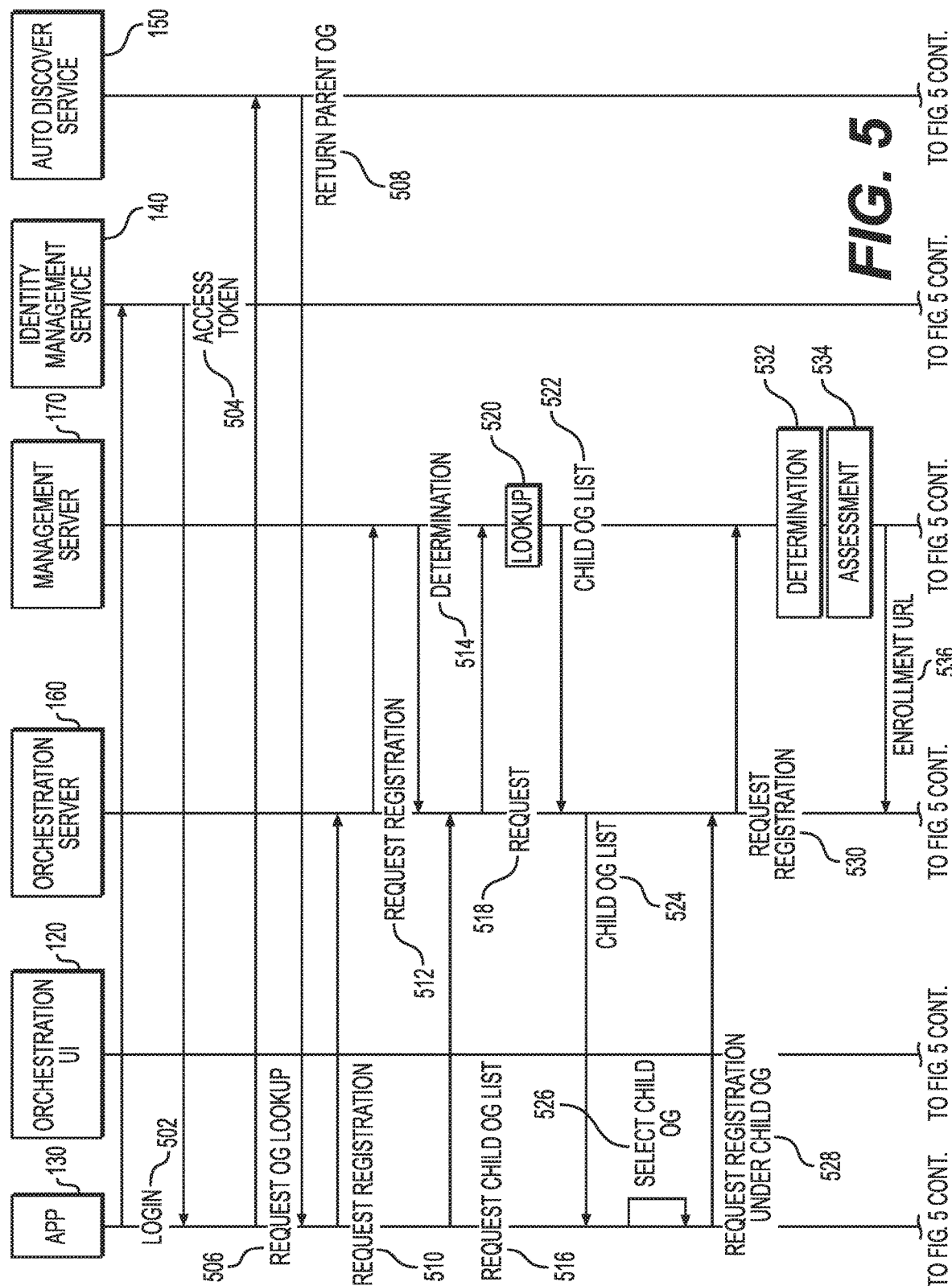
FIG. 5 is a flowchart of an exemplary method for adaptively enrolling a user device with a management system.

FIG. 5 provides a flowchart of another exemplary method for adaptively enrolling a user device with a management system. This example method can be utilized for devices running operating systems that allow for direct enrollment but may require an enterprise feature to be enabled, such as GOOGLE's ANDROID operating system.

The early stages shown in FIG. 5 are similar to the early stages shown in FIG. 4. For example, stages 502-530 of FIG. 5 correspond to stages 402-430 of FIG. 4. The discussion with respect to stages 402-430 is incorporated herein with respect to the corresponding stages 502-530 of FIG. 5. The remaining discussion of FIG. 5 will focus on stages 532-566 of FIG. 5 (and FIG. 5 CONT.).

At stage 532 the management server 170 performs a determination as to whether enrollment is enabled for the device 110 and the user. The determination can include various stages. For example, it can include confirming that the selected child organizational group is enabled for direct enrollment through the application 130. The determination can also include verifying that the operating system executing on the device 110 allows for direct enrollment through the application 130. This can include identifying the version of the operating system and comparing it to a whitelist of allowed operating systems and versions.

The determination at stage 532 can also include obtaining information about the operating system as it relates to an enterprise feature that enables enrollment. In the case of an ANDROID operating system, for example, certain versions can include an optional ANDROID FOR WORK enterprise feature that can be enabled at the operating-system level. In that example, the enterprise feature must be enabled in order to perform direct enrollment. Information regarding the operating system of the user device 110, the version of the operating system, and the settings applied to the operating system can be stored at stage 532. It can also be gathered and stored at other stages, such as at stage 534.

If stage 532 results in a determination that the operating system allows for direct enrollment through the application 130, then at stage 534 the management server 170 can perform an assessment to determine whether the device 110 meets any enterprise restrictions, compliance rules, or management policies set by an administrator.

At stage 536 of the example method, after the assessment at stage 534 determines that the user device 110 is allowed to enroll, the management server 170 can send an enrollment URL to the orchestration server 160. The orchestration server 160 can provide the enrollment URL and any other relevant enrollment instructions to the application 130 at stage 538. The management server 170 can provide the enrollment URL and instructions directly to the application 130 in some examples.

At stage 540, the orchestration server 160 can ensure that an enterprise feature, required for direct enrollment, is enabled at the user device 110. As mentioned above, some operating systems, such as ANDROID, can include an optional enterprise feature, such as ANDROID FOR WORK, that can be enabled at the operating-system level. In that example, the enterprise feature must be enabled in order to perform direct enrollment. The management server 170 and/or orchestration server 160 can be aware of the enterprise feature based on information about the operating system obtained at stages 532 or 534.

Stage 540 can include confirming that the operating system is certified for the enterprise feature, confirming that the version of the operating system present on the user device 110 can run the enterprise feature, and confirming that an administrator set up or enabled the enterprise feature for the device 110. If this stage fails, the process can proceed as detailed in FIG. 7. If the stage determines that the enterprise feature is enabled, then the orchestration server 160 or management server 170 can send an instruction to the application 130 to begin enrollment.

At stage 542, enrollment can begin with the application 130 sending an enrollment initiation request to the management server 170. The management server 170 can respond with a device ownership prompt, as shown with element 226 of FIG. 2 CONT, at stage 544. The device ownership prompt can include a prompt within the application 130 for the user to select between employee owned and corporate owned.

Based on the device ownership selection, the management server 170 can configure an enrollment EULA tailored to the selected device type. For example, a corporate-owned device 110 may correspond to an enrollment EULA that includes restrictions on what the user can do with the device 110. At stage 548, the management server 170 can provide the enrollment EULA to the application 130, and at stage 550 the application 130 can return an acceptance from the user.

Stage 552 can include a third-party registration, if required, based on the operating system. In the example of an ANDROID operation system, for example, stage 554 includes registering the device with GOOGLE.

After the third-party registration, the application 130 can obtain an access token from the orchestration server 160 at stage 554. In some examples, the access token is an HMAC token. The application 130 can send a request to the orchestration server 160 or management server 170 requesting enrollment information, such as an HMAC token and MDM device ID. If sent to the orchestration server 160, the orchestration server 160 can send a request to the management server 170 on behalf of the application 130. The management server 170 can check the status of the user device 110 and—if the device 110 is successfully enrolled—retrieve or create an HMAC token.

The HMAC token and MDM device ID can then be send to the orchestration server 160, which then provides both to the application 130, or they can be sent directly to the application 130 from the management server 170. If, on the other hand, the device is not successfully enrolled, the management server 170 can return an error. In some examples, the orchestration server 160, rather than the management server 170, can perform the enrollment check and retrieve the HMAC token and MDM device ID. The application 130 can use the access token to perform enrollment at stage 556. Enrollment can occur through the orchestration server 160, or directly with the management server 170.

At stage 558, the application 130 can load an orchestration UI 120 associated with the orchestration server 160. The orchestration UI 120 allows the management system to present a UI to the user based on information stored at the management system, such as at the orchestration server 160 or management server 170. Using the orchestration UI 120, the device 110 can present the user with a post-enrollment screen at stage 560. The post-enrollment screen can be, for example, the screen shown at element 242 of FIG. 2 CONT. 2. The screen can congratulate the user on a successful enrollment process and provide information regarding obtaining managed applications from the management system.

At stage 562, the user can provide a selection of one or more managed applications that he or she wishes to download and install on the user device 110. For example, the orchestration UI 120 can present a list of managed applications, such that the user can select only those applications that are desired. The request can be delivered to the orchestration server 160 at stage 562, and to the management server 170 at stage 564. The request can also be delivered directly to the management server 170. The management server 170, in turn, can provision the selected applications to the user device at stage 566.

Figure 8A:
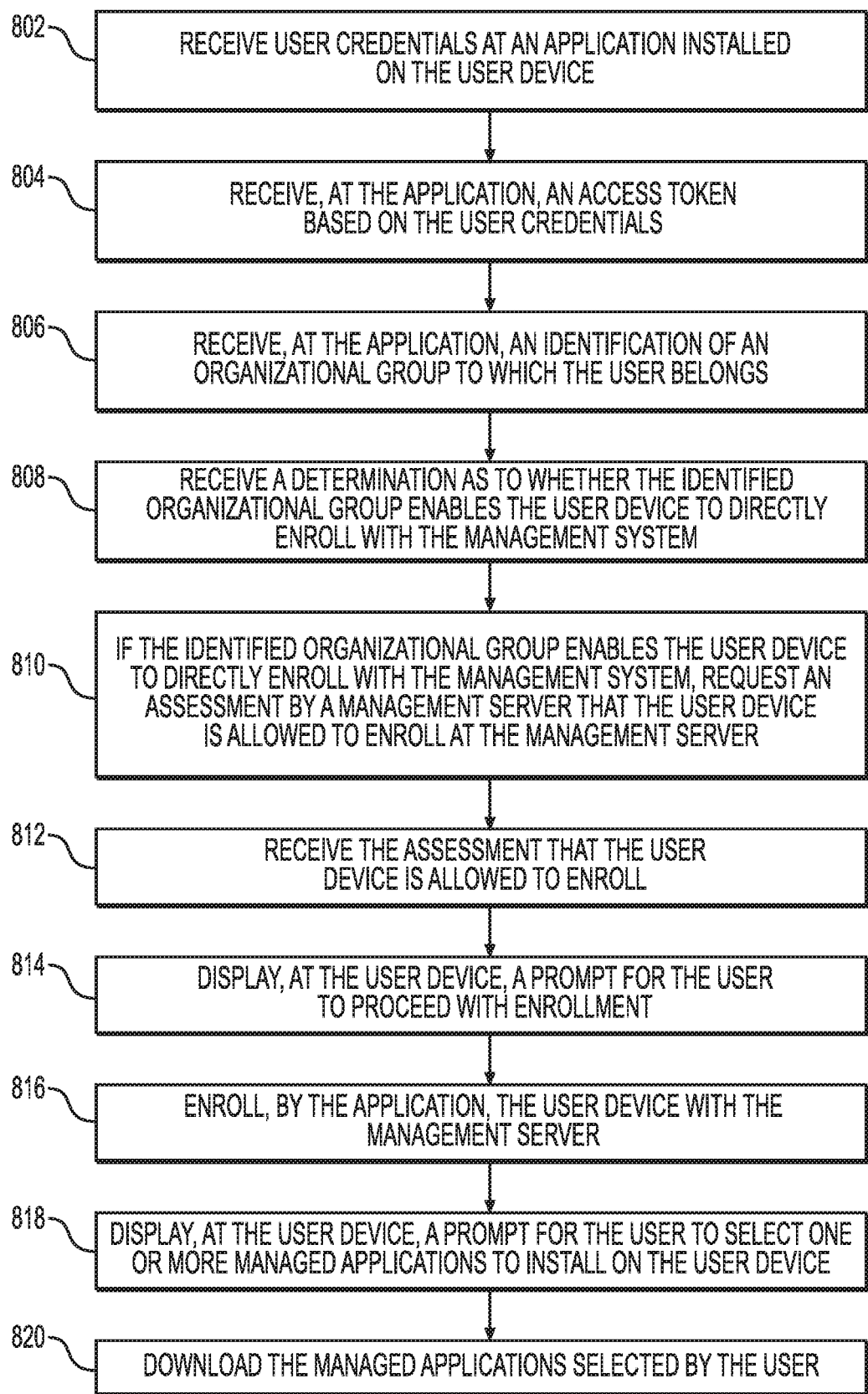
FIG. 8A is a flowchart of an exemplary method for adaptively enrolling a user device with a management system.

FIG. 8A provides a flowchart of another exemplary method for adaptively enrolling a user device with a management system. This example method can be utilized for devices running operating systems that allow for direct enrollment, such as APPLE's iOS or GOOGLE's ANDROID operating systems.

Stage 802 can include receiving user credentials at an application 130 installed on the user device 110. For example, a user can login using the application 130 installed on the user device 110. The login credentials can be sent to the identity management service 140, which after authenticating the user, can send an access token back to the user device 110. The access token can be an HMAC token, for example. At stage 804, the application 130 can receive the access token based on the user credentials.

Stage 806 can include receiving, at the application 130, an identification of an organizational group to which the user belongs. In one example, the identification can be in response to the application 130 requesting an organizational-group lookup from the auto-discover service 150. The auto-discover service 150 can perform the lookup based on an email address, server URL, user credentials, or some combination thereof. For example, the auto-discover service 150 can identify that the email address contains "@vmware.com" and look up an entry for the enterprise environment associated with that email address. The entry may specify one or more organizational groups associated with that enterprise environment. The auto-discover service 150 can return one or more organizational groups back to the user device 110.

Stage 808 can include receiving a determination as to whether the identified organizational group enables the user device to directly enroll with the management system. For example, the management server 170 can determine whether the organizational group to which the user belongs, received at stage 806, allows for direct enrollment to proceed. For example, an organization can enforce finer control over the enrollment process by requiring a specific child organizational group to be selected, rather than allowing enrollment under a more general organizational group. The determination at stage 808 can be made at the user device 110 or orchestration server 160 in some examples. In other examples, the management server 170 makes the determination and provides it to the orchestration server 160, which can then communicate the determination to the user device 110. Alternatively, the management server 170 can provide the determination directly to the user device 110.

At stage 810, if the identified organizational group enables the user device 110 to directly enroll with the management system, a request can be made for an assessment, by the management server 170, that the user device is allowed to enroll at the management server 170. The assessment can be based, at least in part, on restrictions stored at the management server 170. For example, the management server 170 can perform an assessment to determine whether the device 110 meets any enterprise restrictions, compliance rules, or management policies set by an administrator and stored at the management server 170. The assessment can be received by the user device at stage 812.

Stage 814 can include displaying, at the user device 110, a prompt for the user to proceed with enrollment. For example, the application 130 can display an enrollment prompt to the user, similar to that shown by element 220 of FIG. 2 CONT. The prompt can inform the user that he or she must enroll to get access to various enterprise resources, such as corporate email, secure content storage, and VPNs.

Stage 816 can include enrolling, by the application 130, the user device 110 with the management server 170. The application 130 can initiate enrollment with the management server 170. Enrollment can include interacting with an enrollment component or administrator component at the management server 170, or both. The enrollment component can authenticate the access token and can provide to the device 110 any additional credentials required for enrollment. The enrollment component can also provide information regarding how to access and communicate with the administrator component in order to continue the enrollment process.

In some examples, the administrator component can request a token, such as the refreshed access token, from the user device 110, indicating that the user device 110 has been authenticated and is permitted to continue the enrollment process with the administrator component. Upon receiving the token, the administrator component can continue the enrollment process.

Stage 818 can include displaying, at the user device 110, a prompt for the user to select one or more managed applications to install on the user device 110. The application 130 can load an orchestration UI 120 associated with the orchestration server 160. The user can select one or more managed applications that he or she wishes to download and install on the user device 110. For example, the orchestration UI 120 can present a list of managed applications, such that the user can select only those applications that are desired. The request can be delivered to the orchestration server 160 and to the management server 170. The request can also be delivered directly to the management server 170. The management server 170, in turn, can provision the selected applications to the user device at stage 460 at stage 820.

As mentioned above, some operating systems are not able to perform direct enrollment from a single application that also provides single-sign on and access to enterprise applications. For example, some versions of ANDROID require an enterprise feature, such as ANDROID FOR WORK, to be enabled in order to perform direct enrollment through the application 130. If the operating system is not certified for the enterprise feature, the version of the operating system cannot run the enterprise feature, or an administrator has not set up or enables the enterprise feature, then agent enrollment is required. One example of requiring agent enrollment is provided at element 212 of FIG. 2.

Figure 6:
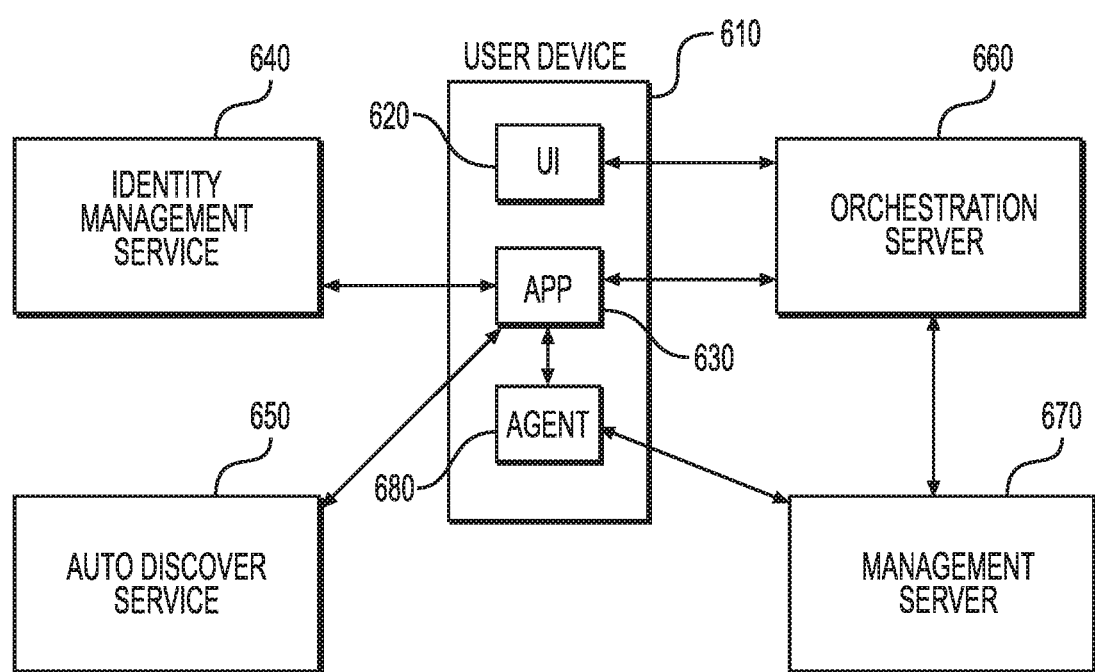
FIG. 6 is an exemplary illustration of system components for adaptively enrolling a user device with a management system.

FIG. 6 provides an example system for adaptively enrolling a user device with a management system where an agent application is required to complete enrollment. The system can include a user device 610. The user device 610 can include an orchestration UI 620, an application 630, and an agent application 680. The orchestration UI 620 can be associated with an orchestration server 660. The application 630 can be the application 130 identified in FIG. 1, and can perform various enterprise functions for the device 610. In some examples, the application 630 is not a dedicated enrollment application, as it performs a variety of other functions unrelated to enrollment. Similarly, the application 630 is not a dedicated device-management application, as it performs functions unrelated to device management, such as providing SSO access to multiple applications and services.

The user device 610 can also include an agent application 680. The agent application 680 can be an application installed on the user device 610 as part of an enrollment process. The agent application 680 can include device-level components and application-level components. The agent application 680 can also include system-level privileges, such as privileges to communicate directly with a management server 670. The agent 680 can enforce settings, such as compliance rules, that are specified at the management server 670. It can also enforce the compliance rules by carrying out actions specified by the management server 670.

In one example, the agent application 680 does not provide a "portal" through which a user can access other applications. That is, the agent application 680 does not present the user with an interface including icons for applications that can be accessed through the agent application 680. In some examples, the user does not interact with the agent application 680 at all. Additionally, the agent application 680 does not provide SSO-based services for accessing applications, as described with respect to the application 630.

The management server 670 can performs management functions as part of an overall EMM or MDM system. It can be a server, computing device, or network of multiple servers or computing devices, having one or more processors and memory stores. The management server 670 can include various components for enrollment and compliance monitoring and enforcement. An administrator can establish or change enrollment criteria at the management server 670, such that a user device can only enroll at the management server 670 if those criteria are met. An administrator can also set compliance rules at the management server 670 that an enrolled user device must follow. The administrator can also set remedial actions for breaching a compliance rule. These functions are discussed in more detail later in this disclosure.

The system of FIG. 6 can also include an identity management service 640, such as vIDM. The identity management service 640 can be a server, computing device, or network of multiple servers or computing devices, having one or more processors and memory stores. The identity management service 640 can control access to enterprise applications or other enterprise data by, for example, issuing an access token to a user device 610 that allows the user device 610 to access one or more enterprise resources. The application 630 can communicate directly with the identity management service 640 via a network, such as the internet.

The system can also include an auto-discover service 650. The auto-discover service 650 can be a server, computing device, or network of multiple servers or computing devices, having one or more processors and memory stores. The auto-discover server 650 can route requests to an appropriate environment based on information contained in the request. For example, the auto-discover server 650 can receive a request that includes an email address and then route the request—or provide other information—based on that email address.

The system of FIG. 6 also includes an orchestration server 660 that can communicate with the management server 670 and the application 630 on the user device 610. The orchestration server 660 can be a server, computing device, or network of multiple servers or computing devices, having one or more processors and memory stores, and can communicate with both the management server 670 and user device 610. For example, the orchestration server 160 can receive a request from the application 630 and pass it to the management server 670, receive a response from the management server 670, and present a UI 620 for the user to make certain selections requested by the management server 670. The UI 620 can receive the selections and pass them to the orchestration server 660, which then passes the selections to the management server 670. The orchestration server 660 can therefore handle an administrative burden for the management server 670, freeing resources for the management server 670 to perform other enterprise-management functions.

Figure 7:
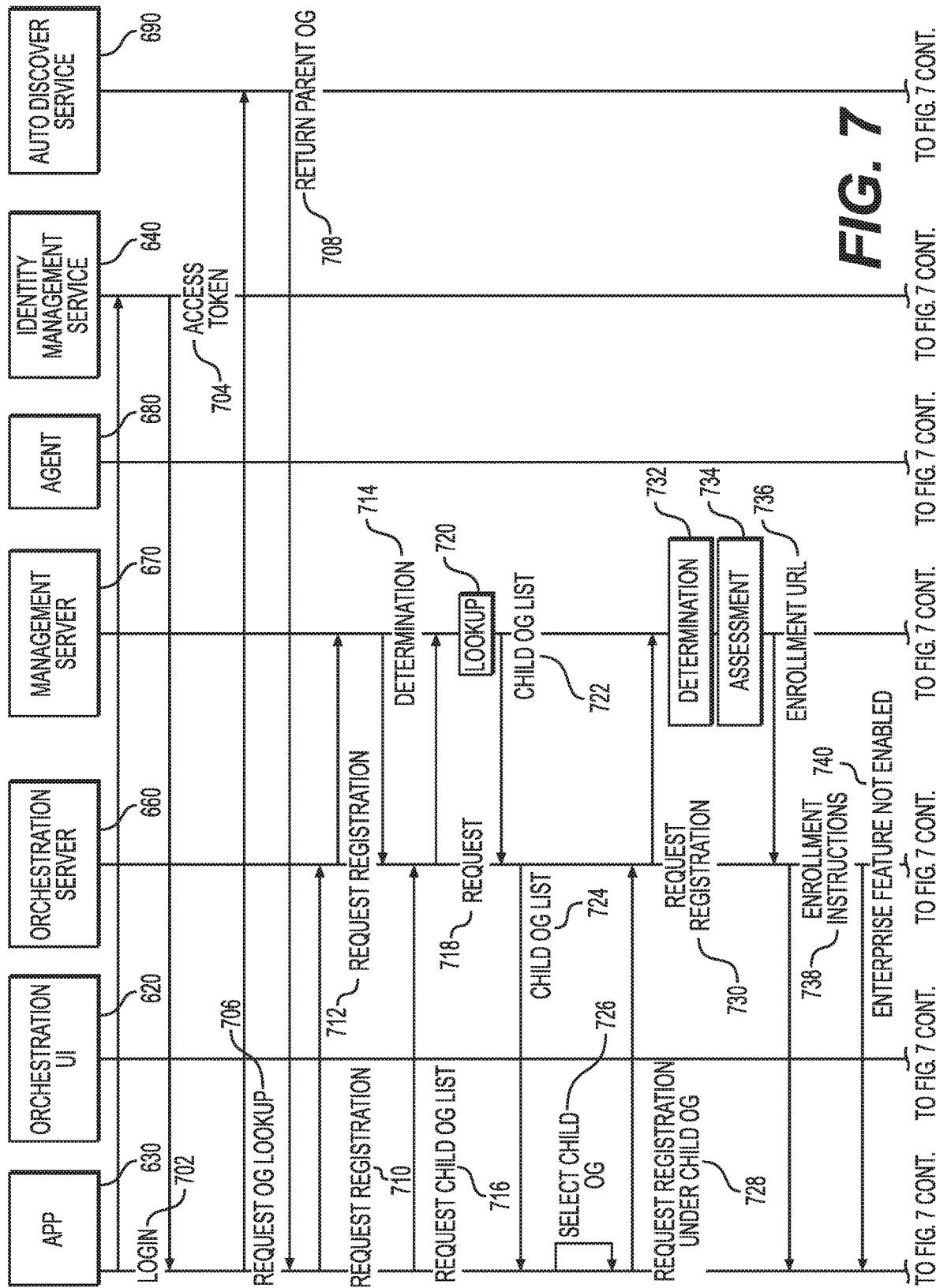
FIG. 7 is a flowchart of an exemplary method for adaptively enrolling a user device with a management system.

FIG. 7 provides a flowchart of an exemplary method for adaptively enrolling a user device with a management system using the system of FIG. 6. This example method can be utilized for devices running operating systems that do not allow for direct enrollment, or either because the operating system is incapable of direct enrollment or because an enterprise feature is not enabled. An example of such an operating system includes certain versions of GOOGLE's ANDROID operating system.

The early stages shown in FIG. 7 are similar to the early stages shown in FIGS. 4 and 5. For example, stages 702-730 of FIG. 7 correspond to 502-530 of FIG. 5 and 402-430 of FIG. 4. The discussion with respect to stages 402-430 is incorporated herein with respect to the corresponding stages 702-730 of FIG. 7. The remaining discussion of FIG. 7 will focus on stages 732-786 of FIG. 7 (and FIG. 7 CONT.).

At stage 732, the management server 670 performs a determination as to whether enrollment is available for the device 610 and the user. The determination can include various stages. For example, it can include confirming that the selected child organizational group is enabled for enrollment with the management server 670. The determination at stage 732 can also include obtaining information about the operating system as it relates to an enterprise feature that enables enrollment. In the case of an ANDROID operating system, for example, certain versions can include an optional ANDROID FOR WORK enterprise feature that can be enabled at the operating-system level. In that example, the enterprise feature must be enabled in order to perform direct enrollment. Information regarding the operating system of the user device 610, the version of the operating system, and the settings applied to the operating system can be stored at stage 732. It can also be gathered and stored at other stages, such as at stage 734.

At stage 734, the management server 670 can perform an assessment to determine whether the device 610 meets any enterprise restrictions, compliance rules, or management policies set by an administrator. At stage 736 of the example method, after the assessment at stage 734 determines that the user device 610 is allowed to enroll, the management server 670 can send an enrollment URL to the orchestration server 660. The orchestration server 660 can provide the enrollment URL and any other relevant enrollment instructions to the application 630 at stage 738. The management server 670 can provide the enrollment URL and instructions directly to the application 630 in some examples.

At stage 740, the orchestration server 660 can determine that an enterprise feature, required for direct enrollment, is not enabled at the user device 610. As mentioned above, some operating systems, such as ANDROID, can include an optional enterprise feature, such as ANDROID FOR WORK, that can be enabled at the operating-system level. In that example, the enterprise feature must be enabled in order to perform direct enrollment. The management server 670 and/or orchestration server 660 can be aware of the enterprise feature based on information about the operating system obtained at stages 732 or 734.

Stage 740 can include determining that at least one of the following conditions is true: the operating system is not certified for the enterprise feature, the version of the operating system present on the user device 610 cannot run the enterprise feature, or the enterprise feature has not been set up or enabled by an administrator. If one or more of those conditions are true, then the method can proceed to stage 742.

At stage 742, the application 630 can present a pre-enrollment screen to the user, informing the user that an agent application 680 is required in order to complete enrollment. The pre-enrollment screen can optionally explain to the user why their device is not able to perform direct enrollment through the application 630, such as by explaining that the operating-system version is incompatible or that an administrator has not enabled an enterprise feature necessary for direct enrollment. The pre-enrollment screen can also provide the user with an option to continue the enrollment process by downloading an agent application.

At stage 744, the application 630 UI is paused and the user is redirected to a page associated with the agent application 680. The page can automatically cause the agent application 680 to be downloaded, or it can present a selection mechanism for the user to elect to download the agent application 680. At stage 746, the agent application 680 is downloaded and the application 630 passes the user's enrollment credentials to the agent application 680.

At stage 748, enrollment can begin with the agent application 680 sending an enrollment initiation request to the management server 670. The management server 670 can respond with a device ownership prompt at stage 750. The agent application 680 can make the selection at stage 752, either automatically or by prompting the user to make a selection. In some examples, the agent application 680 can automatically determine device ownership based on information about the device, such as a device identifier. The ownership selection can be provided to the management server 670 from the agent application 680 at stage 754.

Based on the device ownership selection, the management server 670 can configure an enrollment EULA tailored to the selected device type. For example, a corporate-owned device 610 may correspond to an enrollment EULA that includes restrictions on what the user can do with the device 610. At stage 756, the management server 670 can provide the enrollment EULA to the agent application 680. At stage 758, the agent application 680 can present the EULA to the user and receive an acceptance, and then return the acceptance to the management server 670 at stage 760.

At stage 762, the management server 670 can provide settings to the agent application 680. The settings can include, for example, management policies and compliance rules set at the management server 670. At stage 764, the agent application 680 can request and receive an access token, such as an HMAC token, from the management server 670. The agent application 680 can then complete the enrollment process and ensure that a passcode is set up for the user.

After enrollment is successfully completed, the agent application 680 can return control back to the application 630 by sending an instruction to the application 630 at stage 768. The application 630, in turn, can unpause its UI at stage 770 and load an orchestration UI 620 at stage 772. The orchestration UI 620 allows the management system to present a UI to the user based on information stored at the management system, such as at the orchestration server 660 or management server 670. Using the orchestration UI 620, the device 610 can present the user with a post-enrollment screen at stage 774. The screen can congratulate the user on a successful enrollment process and provide information regarding obtaining managed applications from the management system.

At stage 776, the user can provide a selection of one or more managed applications that he or she wishes to download and install on the user device 610. For example, the orchestration UI 620 can present a list of managed applications, such that the user can select only those applications that are desired. The request can be delivered to the orchestration server 160 at stage 776, and to the management server 670 at stage 778. The request can also be delivered directly to the management server 670. The management server 670, in turn, can provision the selected applications to the user device at stage 780.

Figure 8B:
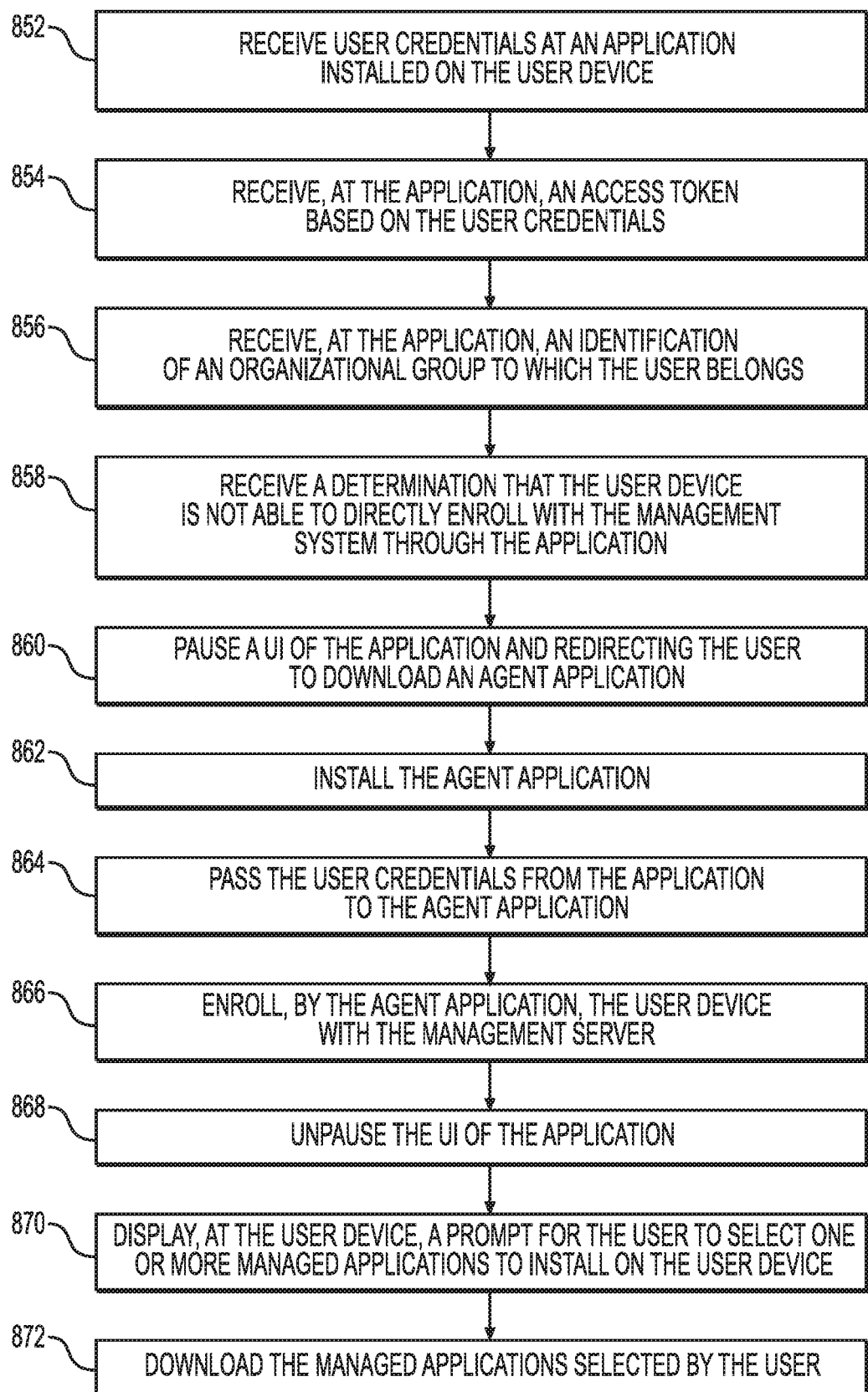
FIG. 8B is a flowchart of an exemplary method for adaptively enrolling a user device with a management system.

FIG. 8B provides a flowchart of another exemplary method for adaptively enrolling a user device with a management system. This example method can be utilized for devices running operating systems that are not able to perform direct enrollment from a single application that also provides single-sign on and access to enterprise applications, such as some versions of GOOGLE's ANDROID operating systems Stage 852 can include receiving user credentials at an application 630 installed on the user device 610. For example, a user can login using the application 630 installed on the user device 610. The login credentials can be sent to the identity management service 640, which after authenticating the user, can send an access token back to the user device 610. The access token can be an HMAC token, for example. At stage 854, the application 630 can receive the access token based on the user credentials.

Stage 856 can include receiving, at the application 630, an identification of an organizational group to which the user belongs. In one example, the identification can be in response to the application 630 requesting an organizational-group lookup from the auto-discover service 650. The auto-discover service 650 can perform the lookup based on an email address, server URL, user credentials, or some combination thereof. For example, the auto-discover service 650 can identify that the email address contains "@vmware.com" and look up an entry for the enterprise environment associated with that email address. The entry may specify one or more organizational groups associated with that enterprise environment. The auto-discover service 650 can return one or more organizational groups back to the user device 610.

Stage 858 can include receiving a determination that the user device 610 is not able to directly enroll with the management system through the application 630. For example, the orchestration server 660 can determine that an enterprise feature, required for direct enrollment, is not enabled at the user device 610. As mentioned above, some operating systems, such as ANDROID, can include an optional enterprise feature, such as ANDROID FOR WORK, that can be enabled at the operating-system level. In that example, the enterprise feature must be enabled in order to perform direct enrollment. Stage 858 can include determining that at least one of the following conditions is true: the operating system is not certified for the enterprise feature, the version of the operating system present on the user device 610 cannot run the enterprise feature, or the enterprise feature has not been set up or enabled by an administrator. If one or more of those conditions are true, then the method can proceed to stage 860.

Stage 860 can include pausing a UI of the application 630 and redirecting the user to download an agent application 680. A page associated with the agent application 680 can automatically cause the agent application 680 to be downloaded, or it can present a selection mechanism for the user to elect to download the agent application 680. At stage 862, the agent application 680 is downloaded and installed, and the application 630 passes the user's enrollment credentials to the agent application 680 at stage 864.

Stage 866 can include enrolling, by the agent application 680, the user device 610 with the management server 670. Enrollment can begin with the agent application 680 sending an enrollment initiation request to the management server 670. The management server 670 can respond with a device ownership prompt. The agent application 680 can make a device-ownership selection, either automatically or by prompting the user to make a selection. In some examples, the agent application 680 can automatically determine device ownership based on information about the device, such as a device identifier. The ownership selection can be provided to the management server 670 from the agent application 680.

Based on the device ownership selection, the management server 670 can configure an enrollment EULA tailored to the selected device type. For example, a corporate-owned device 610 may correspond to an enrollment EULA that includes restrictions on what the user can do with the device 610. The management server 670 can provide the enrollment EULA to the agent application 680. The agent application 680 can present the EULA to the user and receive an acceptance, and then return the acceptance to the management server 670.

The management server 670 can also provide settings to the agent application 680. The settings can include, for example, management policies and compliance rules set at the management server 670. The agent application 680 can request and receive an access token, such as an HMAC token, from the management server 670. The agent application 680 can then complete the enrollment process and ensure that a passcode is set up for the user.

Stage 868 can include unpausing the UI of the application 630. The agent application 680 can return control back to the application 630 by sending an instruction to the application 630. The application 630, in turn, can unpause its UI and load an orchestration UI 620. The orchestration UI 620 allows the management system to present a UI to the user based on information stored at the management system, such as at the orchestration server 660 or management server 670. Using the orchestration UI 620, the device 610 can present the user with a post-enrollment screen. The screen can congratulate the user on a successful enrollment process and provide information regarding obtaining managed applications from the management system. For example, at stage 870, the device 610 can present the user with a prompt for the user to select one or more managed applications to install on the user device 610.

The user can provide a selection of one or more managed applications that he or she wishes to download and install on the user device 610. The request can be delivered to the orchestration server 160 and the management server 670. The request can also be delivered directly to the management server 670. The management server 670, in turn, can provision the selected applications to the user device at stage 872.

Figure 9:
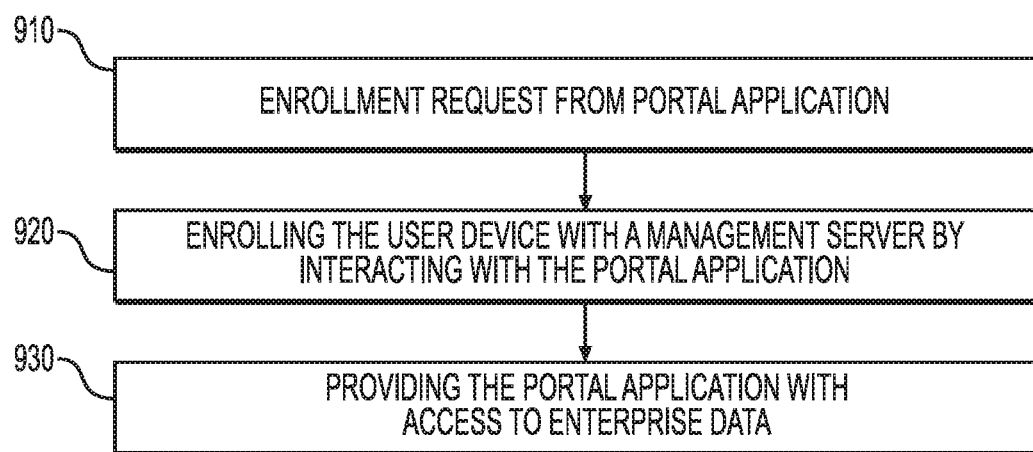
FIG. 9 is a flowchart of an exemplary method for adaptively enrolling a user device with a management system.

FIG. 9 provides a flowchart of an exemplary method for enrolling a user device 110 with a management system using a portal application 130. The portal application 130 can be the application 130 of FIG. 1 or the application 630 of FIG. 6, for example. As explained with respect to the application 130 of FIG. 1, the portal application 130 can store a user's credentials and display icons corresponding to a plurality of applications available, or potentially available, to the user. The portal application 130 can provide access to a selected application of the plurality of applications by authenticating the user to the selected application. For example, the portal application 130 can use SSO services to authenticate the user.

The example method can include, at stage 910, receiving an enrollment request from the portal application 130. The enrollment request can be received at the management server 170 or received at the orchestration server 160 and then routed to the management server 170.

At stage 920, the management server 170 can enroll the user device by interacting with the portal application 130. This can include, for example, having the management server 170 determine that the device 110 is able to enroll through the portal application 130, as explained with respect to stage 432 of FIG. 4 CONT. The management server 170 can also perform an assessment to determine whether the device 110 meets any relevant enterprise restrictions, compliance rules, or management policies set by an administrator, as explained with respect to stage 434 of FIG. 4 CONT.

If the device 110 meets the relevant requirements set at the management server 170, the management server 170 can provide an enrollment URL, along with any other enrollment instructions, to the portal application 130. The portal application 130 can request a refreshed access token, if necessary, before continuing with enrollment. Enrollment can include interacting with an enrollment component or administrator component at the management server 170, or both. The enrollment and administrator components can authenticate tokens associated with the user device 110 and provide further instructions for continuing enrollment.

Upon successful enrollment, the management server 170 can send a notice to the portal application 130, informing that enrollment was successful. The management server 170 can also send an enrollment token to the user device 110. In some examples, the enrollment token is an HMAC token. In an example, the portal application 130 can request the HMAC token from the management server 170. The management server 170 can check the status of the user device 110 and—if the device 110 is successfully enrolled—retrieve or create an HMAC token. The HMAC token and MDM device ID can then be sent to the portal application 130.

At stage 930, the management server 170 can provide the portal application 130 with access to enterprise data. For example, the portal application 130 can be authorized to access secure applications, such as CONTENT LOCKER or the BOXER email application. The portal application 130 can authenticate the user and user device 110 to these applications, using one or more credentials provided as a result of the enrollment process. The user can then access enterprise data by launching a secure application through the portal application 130, without having to provide additional credentials or login information.

Figure 10:
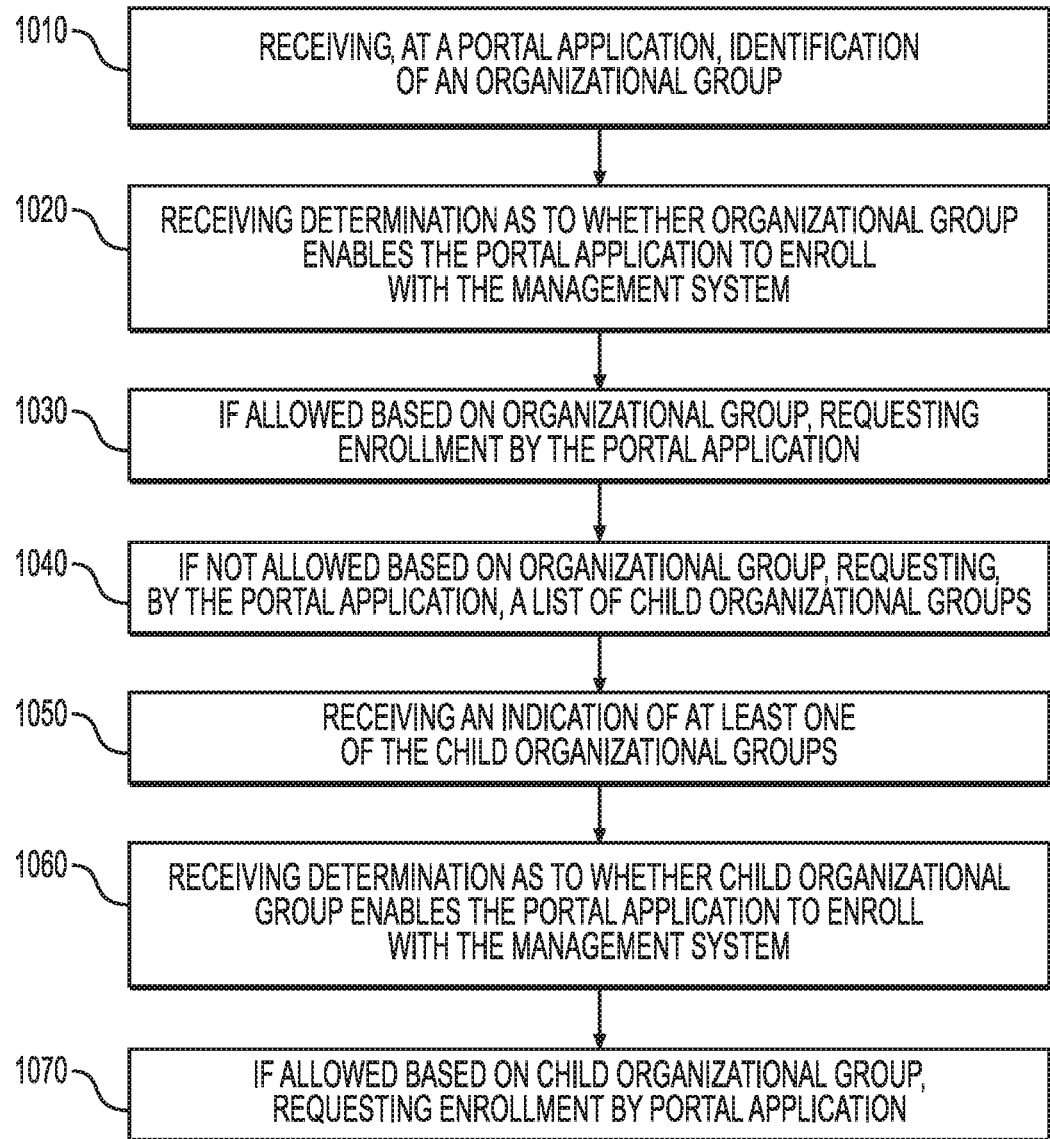
FIG. 10 is a flowchart of an exemplary method for adaptively enrolling a user device with a management system.

FIG. 10 provides a flowchart of an example method for determining enrollment requirements for enrolling a user into a management system. Stage 1010 can include receiving, at a portal application 130, an identification of an organizational group to which the user belongs. For example, the portal application 130 can request an organizational group lookup from an auto-discover service 150. The auto-discover service 150 can perform the lookup based on an email address, server URL, user credentials, or some combination thereof. For example, the auto-discover service 150 can identify that the email address contains "@vmware.com" and look up an entry for the enterprise environment associated with that email address. The entry may specify one or more organizational groups associated with that enterprise environment. The auto-discover service 150 can return one or more organizational groups back to the user device 110.

Stage 1020 can include receiving a determination as to whether the organizational group enables the portal application 130 to enroll with the management system. The management server 170 can determine whether the organizational group to which the user belongs allows for direct enrollment to proceed. For example, an organization can enforce finer control over the enrollment process by requiring a specific child organizational group to be selected, rather than allowing enrollment under a more general organizational group. The determination can be made at the user device 110 or orchestration server 160 in some examples.

If the organizational group allows for enrollment by the portal application 130, the portal application 130 can request enrollment at the management server 170 at stage 1030. The portal application 130 can request a refreshed access token, if necessary, before continuing with enrollment. Enrollment can include interacting with an enrollment component or administrator component at the management server 170, or both. The enrollment and administrator components can authenticate tokens associated with the user device 110 and provide further instructions for continuing enrollment.

If, on the other hand, the organizational group does not allow enrollment by the portal application 130, then the portal application 130 can request a list of child organizational groups. The request can be sent to the orchestration server 160 which can then forward the request along to the management server 170. Alternatively, the request can be sent directly to the management server 170.

The management server 170 can perform a look-up to pull a list of child organizational groups. The look-up can be performed based on information regarding the user device 110, user, relevant enterprise environment, selected organizational group, rules set by an administrator, or any combination thereof. The list of child organizational groups can be sent to the user device 110 at stage 1050.

At stage 1050, the user device 110 can receive an indication of at least one of the child organizational groups. For example, the user can select a child organizational group through the portal application 130. The selection can include, for example, selecting from a drop-down list of available child organizational groups. The available groups can also be presented in a different format, such as multiple buttons, where the user simply selects the button corresponding to the desired child organizational group. In another example, the management server 170 provides a selection of the appropriate child organizational group based on information stored at the management server 170.

At stage 1060, the user device 110 can receive a determination as to whether the child organizational group enables the portal application 130 to enroll with the management system. The determination can include various stages. For example, it can include confirming that the selected child organizational group is enabled for direct enrollment through the portal application 130. The determination can also include verifying that the operating system executing on the device 110 allows for direct enrollment through the portal application 130. This can include identifying the version of the operating system and comparing it to a whitelist of allowed operating systems and versions.

Figure 11:
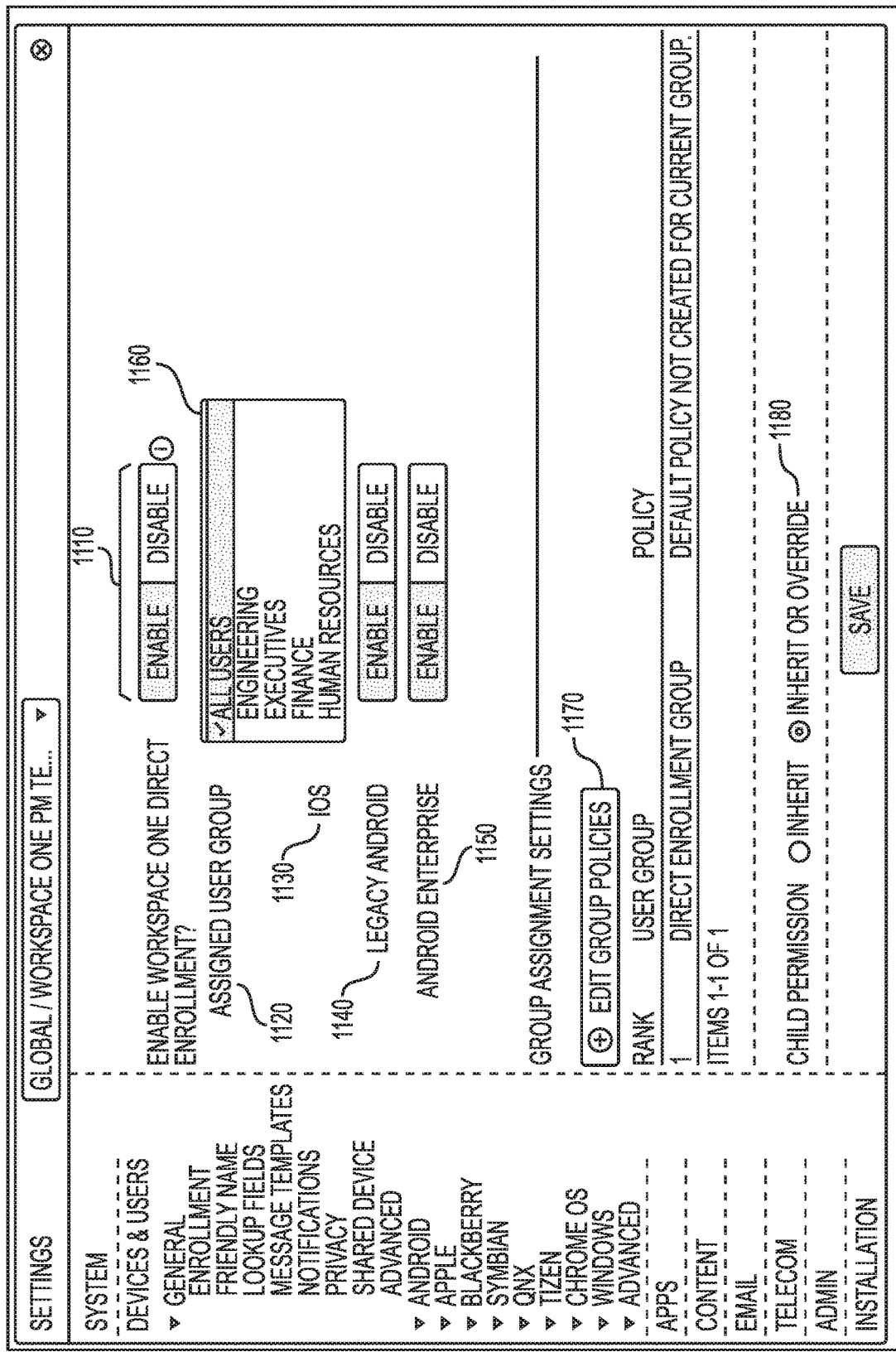
FIG. 11 is an illustration of an example administrator console that can allow an administrator to control various features related to adaptively enrolling a user device with a management system.

If enrollment is allowed through the portal application 130 for the selected child organizational group, then at stage 1070 the portal application 130 can request enrollment. The portal application 130 can request a refreshed access token, if necessary, before continuing with enrollment. Enrollment can include interacting with an enrollment component or administrator component at the management server 170, or both. The enrollment and administrator components can authenticate tokens associated with the user device 110 and provide further instructions for continuing enrollment FIG. 11 is an illustration of an example administrator console that can allow an administrator to control various features related to adaptively enrolling a user device 110 with a management system as described in conjunction with any portion of the previous discussion. The console can include a direct enrollment toggle 1110 that allows an administrator to enable, or disable, direct enrollment through a portal application 130. In this example, the portal application 130 is WORKSPACE ONE. If the administrator elects to disable this feature, then a user device 110 associated with the administrator's enterprise would not be able to enroll with the management server 170 using the portal application 130. For example, the determinations described with respect to stages 432 and 434 of FIG. 4 CONT., stages 532 and 534 of FIG. 5, and stages 732 and 734 of FIG. 7 would result in not allowing the user device 110 to perform enrollment through the portal application 130.

A user-group assignment field 1120 is also provided at the administrator console. The user-group assignment field 1120 can allow an administrator to enable or disable enrollment by the portal application 130 for a particular organizational group. In the example of FIG. 11, the user-group assignment field 1120 is selected, displaying a drop-down menu 160 that provides options for selecting a particular organizational group or selecting all users. In some examples, the field 1120 can be directed to child organizational groups and the drop-down menu 160 can provide a list of child organizational groups. In another example, a separate field is provided for child organizational groups.

The administrator console can also allow an administrator to tailor direct enrollment settings based on the operating system of the user device 110. For example, the console includes an iOS selection 1130, legacy ANDROID selection 1140, and ANDROID enterprise selection 1150. The buttons associated with the iOS selection 1130 are temporarily blocked from view due to the drop-down menu 1160, but are provided in a similar relative location and format to the "enable" and "disable" buttons associated with the legacy ANDROID selection 1140 and ANDROID enterprise selection 1150. With each of these selections 1130, 1140, 1150, an administrator can tailor the ability to use a portal application 130 to enroll a user device 110 with the management system by allowing or not allowing particular operating systems.

An administrator can create, edit, and delete group policies. A group policy can set forth various parameters for allowing direct enrollment by the portal application 130. For example, a group policy can enable direct enrollment for users in the "engineering" organizational group with user devices 110 that run the iOS operating system. In that example, the administrator would select "enable" at the enable WORKSPACE ONE prompt 1110, navigate the drop-down menu 1160 for the assigned user group selection 1120 to select "engineering," select "enable" at the iOS selection 1130 and "disable" at both the legacy ANDROID selection 1140 and ANDROID enterprise selection 1150. That group policy can appear in the list of policies shown in the console, and can be edited by using the edit-group-policies button 1170. The administrator can also determine whether a child organizational group should inherit group assignment settings without overriding other settings, or inherit the settings and override as necessary, by toggling the child permission setting 1180.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for dynamically determining enrollment requirements and enrolling a user device into a management system, comprising:

receiving user credentials at an application installed on the user device, the application not being an agent application dedicated to perform device enrollment;

receiving, at the application, an access token based on the user credentials;

receiving, at the application, an identification of an organizational group to which the user belongs;

receiving a determination that the user device is not able to directly enroll with the management system through the application based, at least in part, on one or more attributes associated with the user or the user device;

pausing a UI of the application and redirecting the user to download the agent application;

installing the agent application;

passing the user credentials from the application to the agent application;

enrolling, by the agent application, the user device with the management server;

unpausing the UI of the application;

displaying, at the user device, a prompt for the user to select one or more managed applications to install on the user device; and downloading the managed applications selected by the user.

2. The method of claim 1, wherein receiving the determination that the user device is not able to directly enroll with the management system through the application further comprises receiving a determination that the operating system of the user device requires an enterprise feature to be enabled in order to perform direct enrollment, and that the enterprise feature has not been enabled for the user device.

3. The method of claim 1, wherein receiving the determination that the user device is not able to directly enroll with the management system through the application further comprises receiving a determination that the identified organizational group does not enable the user device to directly enroll.

4. The method of claim 1, wherein receiving an identification of an organizational group to which the user belongs further comprises:

requesting a list of child organizational groups available for the identified organizational group; and receiving an indication of at least one of the child organizational groups to which the user belongs.

5. The method of claim 4, wherein receiving a determination that the user device is not able to directly enroll with the management system through the application further comprises receiving a determination that the at least one indicated child organizational group does not enable the user device to directly enroll.

6. The method of claim 5, wherein receiving a determination that the at least one indicated child organizational group does not enable the user device to directly enroll comprises receiving a determination from the management server that the indicated child organizational group does not enable the user device to directly enroll.

7. The method of claim 1, further comprising prompting the user, at a UI of the agent application, to provide a selection indicating whether the user device is corporate owned, and presenting a terms-of-use agreement to the user, on the agent application UI, based on the selection.

8. A non-transitory, computer-readable medium comprising instructions that, when executed by a processor of a user device, perform stages for dynamically determining enrollment requirements and enrolling the user device into a management system, the stages comprising:

receiving user credentials at an application installed on the user device, the application not being an agent application dedicated to perform device enrollment;

receiving, at the application, an access token based on the user credentials;

receiving, at the application, an identification of an organizational group to which the user belongs;

receiving a determination that the user device is not able to directly enroll with the management system through the application based, at least in part, on one or more attributes associated with the user or the user device;

pausing a UI of the application and redirecting the user to download an agent application;

installing the agent application;

passing the user credentials from the application to the agent application;

enrolling, by the agent application, the user device with the management server;

unpausing the UI of the application;

displaying, at the user device, a prompt for the user to select one or more managed applications to install on the user device; and downloading the managed applications selected by the user.

9. The non-transitory, computer-readable medium of claim 8, wherein receiving a determination that the user device is not able to directly enroll with the management system through the application further comprises receiving a determination that the operating system of the user device requires an enterprise feature to be enabled in order to perform direct enrollment, and that the enterprise feature has not been enabled for the user device.

10. The non-transitory, computer-readable medium of claim 8, wherein receiving the determination that the user device is not able to directly enroll with the management system through the application further comprises receiving a determination that the identified organizational group does not enable the user device to directly enroll.

11. The non-transitory, computer-readable medium of claim 8, wherein receiving an identification of an organizational group to which the user belongs further comprises:

requesting a list of child organizational groups available for the identified organizational group; and receiving an indication of at least one of the child organizational groups to which the user belongs.

12. The non-transitory, computer-readable medium of claim 11, wherein receiving a determination that the user device is not able to directly enroll with the management system through the application further comprises receiving a determination that the at least one indicated child organizational group does not enable the user device to directly enroll.

13. The non-transitory, computer-readable medium of claim 12, wherein receiving a determination that the at least one indicated child organizational group does not enable the user device to directly enroll comprises receiving a determination from the management server that the indicated child organizational group does not enable the user device to directly enroll.

14. The non-transitory, computer-readable medium of claim 8, the stages further comprising prompting the user, at the agent application, to provide a selection indicating whether the user device is corporate owned, and presenting a terms-of-use agreement to the user, at the agent application, based on the selection.

15. A system for dynamically determining enrollment requirements and enrolling a user device into a management system, comprising:

a user device having a processor, display, and memory storage;

wherein the memory storage contains a non-transitory, computer-readable medium comprising instructions that, when executed by the processor, carry out stages comprising:

receiving user credentials at an application installed on the user device, the application not being an agent application dedicated to perform device enrollment;

receiving, at the application, an access token based on the user credentials;

receiving, at the application, an identification of an organizational group to which the user belongs;

receiving a determination that the user device is not able to directly enroll with the management system through the application based, at least in part, on one or more attributes associated with the user or the user device;

pausing a UI of the application and redirecting the user to download an agent application;

installing the agent application;

passing the user credentials from the application to the agent application;

enrolling, by the agent application, the user device with the management server;

unpausing the UI of the application;

displaying, at the user device, a prompt for the user to select one or more managed applications to install on the user device; and downloading the managed applications selected by the user.

16. The system of claim 15, wherein receiving the determination that the user device is not able to directly enroll with the management system through the application further comprises receiving a determination that the operating system of the user device requires an enterprise feature to be enabled in order to perform direct enrollment, and that the enterprise feature has not been enabled for the user device.

17. The system of claim 15, wherein receiving the determination that the user device is not able to directly enroll with the management system through the application further comprises receiving a determination that the identified organizational group does not enable the user device to directly enroll.

18. The system of claim 15, wherein receiving an identification of an organizational group to which the user belongs further comprises:

requesting a list of child organizational groups available for the identified organizational group; and receiving an indication of at least one of the child organizational groups to which the user belongs.

19. The system of claim 18, wherein receiving a determination that the user device is not able to directly enroll with the management system through the application further comprises receiving a determination that the at least one indicated child organizational group does not enable the user device to directly enroll.

20. The system of claim 15, further comprising prompting the user, at a UI of the agent application, to provide a selection indicating whether the user device is corporate owned, and presenting a terms-of-use agreement to the user, on the agent application UI, based on the selection.

* * * * *